United States Patent [19]

Wakabayashi et al.

[11] Patent Number: 5,555,050
[45] Date of Patent: Sep. 10, 1996

[54] FILM FEEDING APPARATUS IN A CAMERA

[75] Inventors: Tsutomu Wakabayashi, Tokyo; Koichi Daitoku, Sagamihara; Akira Ezawa, Tokyo, all of Japan

[73] Assignee: Nikon Corporation, Tokyo, Japan

[21] Appl. No.: 459,297

[22] Filed: Jun. 2, 1995

Related U.S. Application Data

[63] Continuation of Ser. No. 337,516, Nov. 8, 1994, abandoned, which is a continuation of Ser. No. 247,467, May 23, 1994, abandoned, which is a continuation of Ser. No. 107,038, Aug. 17, 1993, abandoned, which is a continuation of Ser. No. 978,460, Nov. 19, 1992, abandoned, which is a continuation of Ser. No. 859,966, Mar. 30, 1992, abandoned, which is a division of Ser. No. 758,307, Aug. 28, 1991, Pat. No. 5,136,314, which is a continuation of Ser. No. 617,584, Nov. 26, 1990, abandoned.

[30] Foreign Application Priority Data

| Nov. 28, 1989 | [JP] | Japan | 1-306620 |
| Dec. 28, 1989 | [JP] | Japan | 1-338350 |

[51] Int. Cl.⁶ .................................................. G03B 1/18
[52] U.S. Cl. ................................................... 354/173.1
[58] Field of Search ..................... 354/173.1, 173.11, 354/212, 213, 214, 275

[56] References Cited

U.S. PATENT DOCUMENTS

| Re. 32,558 | 12/1987 | Chan | 354/173.1 |
| 4,440,481 | 4/1984 | Hoda et al. | 354/213 X |
| 4,579,435 | 4/1986 | Haraguchi | 354/173.1 |
| 4,616,913 | 10/1986 | Suzuki et al. | 354/173.1 |
| 4,779,111 | 10/1988 | Ogawa et al. | 354/173.11 |
| 4,832,275 | 5/1989 | Robertson | 242/71.1 |
| 4,834,306 | 5/1989 | Robertson et al. | 242/71.1 |
| 4,855,773 | 8/1989 | Harvey | 354/173.1 |
| 4,948,063 | 8/1990 | Niedospial, Jr. | 354/275 X |
| 5,061,950 | 10/1991 | Suzuki et al. | 354/173.11 |
| 5,136,314 | 8/1992 | Kazami et al. | 354/173.1 |
| 5,255,034 | 10/1993 | Shimada et al. | 354/173.1 |

FOREIGN PATENT DOCUMENTS 0446915  9/1991  European Pat. Off. .

*Primary Examiner*—Howard B. Blankenship
*Attorney, Agent, or Firm*—Shapiro and Shapiro

[57] ABSTRACT

A film feeding apparatus in a camera comprises a feeding device for feeding film from a film cartridge, a take-up spool device for taking up the film fed by the feeding device, and a judgment device for judging on the basis of a variation in the movement speed of the film whether the film has been taken up by the take-up spool. The movement speed of the film is determined by the feeding device before the film extending from the film cartridge is taken up by the take-up spool device, and the movement speed of the film is determined by the take-up spool device after the film has been taken up by the take-up spool device. The movement speed of the film driven by the feeding device differs from the movement speed of the film driven by the take-up spool device.

11 Claims, 16 Drawing Sheets

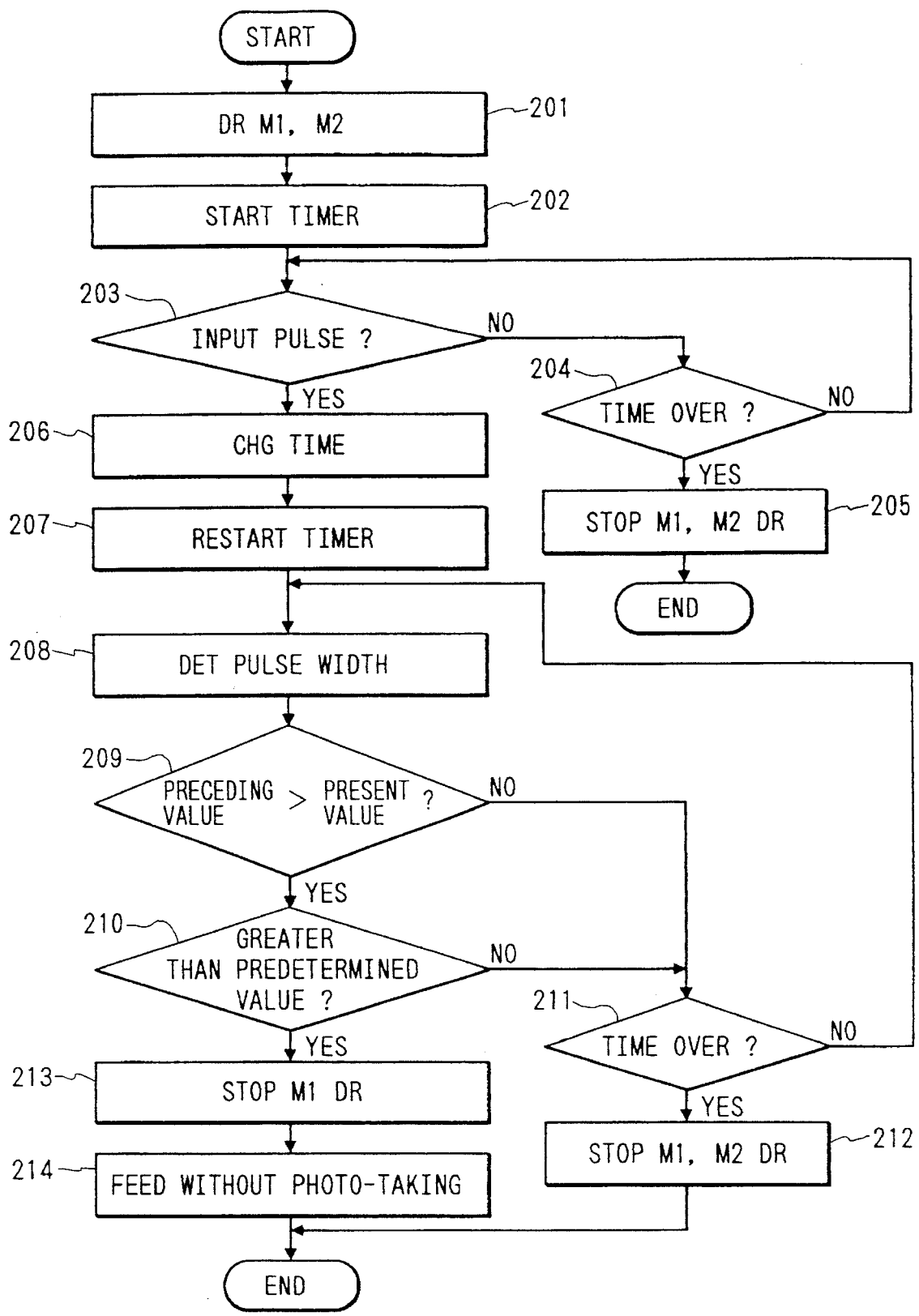

FIG. 7
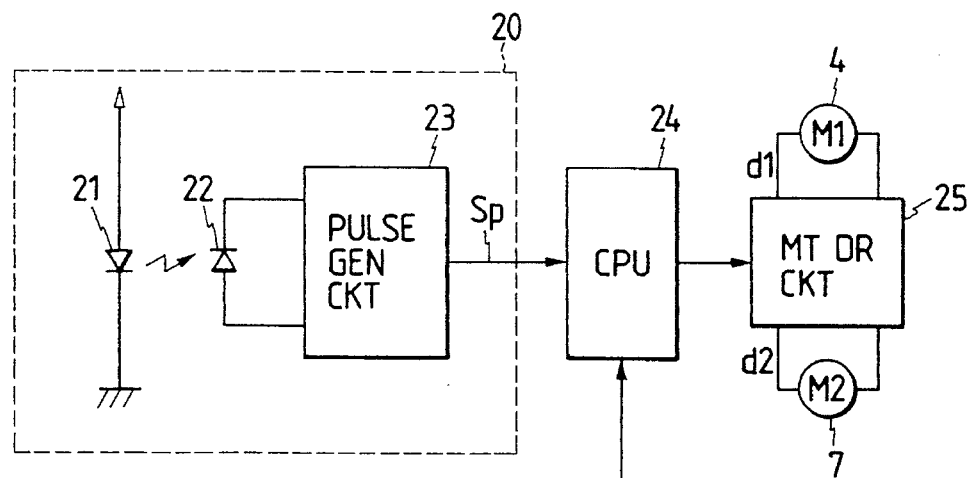
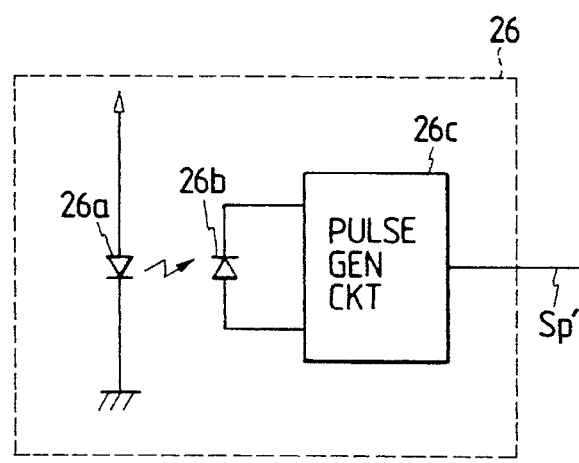
FIG. 8
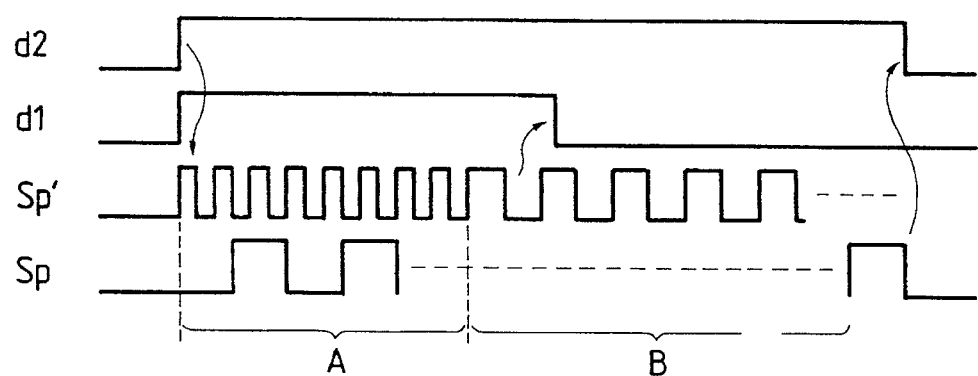

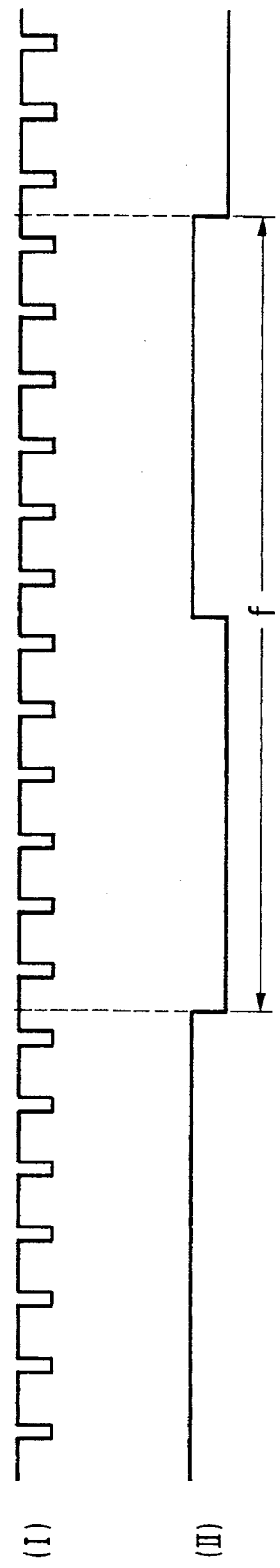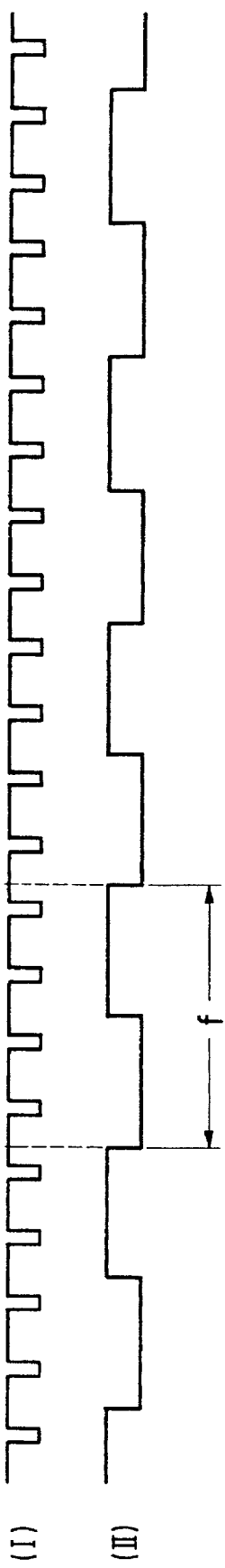

FILM FEEDING APPARATUS IN A CAMERA

This is a continuation of application Ser. No. 08/337,516 filed Nov. 8, 1994, which is a continuation of application Ser. No. 08/247,467 filed May 23, 1994, which is a continuation of application Ser. No. 08/107,038 filed Aug. 17, 1993, which is a continuation of application Ser. No. 07/978,460 filed Nov. 19, 1992, which is a continuation of application Ser. No. 07/859,966 filed Mar. 30, 1992, (all now abandoned), which is a division of application Ser. No. 07/758,307 filed Aug. 28, 1991 (now U.S. Pat. No. 5,136,314), which is a continuation of application Ser. No. 07/617,584 filed Nov. 26, 1990 (abandoned).

BACKGROUND OF THE INVENTION

1. Field of the Invention

This invention relates to a film feeding apparatus in a camera adapted to be loaded with a film cartridge of the type in which the leading end of film is not exposed out of a feeding port.

2. Related Background Art

A film cartridge of the structure shown, for example, in U.S. Pat. No. 4,832,275 or U.S. Pat. No. 4,834,306 has heretofore been proposed as a film cartridge 502 comprising a cylindrical portion 502a having therein a spool shaft containing a roll of photographic film 501 therein, and a film feeding portion 502b extending integrally therewith in the tangential direction thereof and containing the leading end side of the film in a straight state. The construction disclosed in U.S. Pat. No. 4,832,275 is schematically shown in FIG. 19 of the accompanying drawings. According to this cartridge 502, the spool shaft provided in the cylindrical portion 502a is rotatively driven in the feed direction of the film 501 (the direction of solid-line arrow in the figure) by the shaft end portion thereof (the spline portion indicated by 502c in the figure), whereby the film 501 is fed out from the leading end side thereof through a feed port in the end of the feeding portion 502, as indicated by dots-and-dash line in the figure, and the spool shaft is rotatively driven in the rewinding direction (the broken-line arrow in the figure), whereby the film 501 is rewound and the leading end of the film can be wound into the feeding portion 502b. According to such cartridge structure, when the cartridge is to be loaded into a camera or when the cartridge is to be taken out with the film taken up after the termination of photographing, the leading end of the film 501 is in a state in which it has been drawn into the cartridge 502 and moreover, the feeding of the film 501 can be automatically accomplished by the spool shaft being rotatively driven by an electric motor or the like and therefore, the handling of the film 501, such as the loading of the film 501 into a camera, becomes easy to the operator. In this example, there is illustratively shown a case where perforations 501a are continuously formed in the upper and lower side edges of the film 501 as in the 135 type film.

However, there is no publication which discloses camera structure which can be loaded with a film cartridge 502 of this type and the internal mechanism thereof, and particularly a specific example of a mechanism by which the film 501 is fed out of the cartridge 502 and is wound up one frame by one and is rewound into the cartridge 502, and the advent of a camera provided with a feeding mechanism, a winding mechanism and a rewinding mechanism for film capable of causing the advantages of the cartridge structure as described above to be displayed has been desired.

Particularly, what is required for constructing a camera of this kind is to develop the structure of an automatic loading mechanism called auto-loading. That is, for the film cartridge of the described type, the use of a camera's automatic loading mechanism using the well-known 135 type film cartridge in which the leading end of film is drawn out by a predetermined amount is practically impossible because the film feeding structure differs. Accordingly, it has been desired that a film feeding apparatus which can automatically feed out to and wound onto the take-up spool side such film 501 having its leading end introduced into the cartridge 502 simply by the cartridge being loaded into a camera and can accomplish the automatic loading of the film stably and reliably be provided by a simplest possible construction.

SUMMARY OF THE INVENTION

It is an object of the present invention to provide a film feeding apparatus which is simple in construction and yet can accomplish the automatic loading of film.

It is another object of the present invention to provide a film feeding apparatus which can automatically effect the rewinding of film and again effect the feeding of the film when a failure in the loading of the film is encountered.

To achieve the above objects of the present invention, the film feeding apparatus of the present invention has film feeding means for feeding the leader portion of film from a film cartridge loaded in a camera at a predetermined speed, film take-up means for automatically winding the fed leader portion of the film onto a take-up spool and taking up it onto said take-up spool at a speed higher than said predetermined speed, movement speed detecting means for outputting a signal corresponding to the movement speed of the film, and discriminating means for receiving the signal corresponding to the movement speed from said movement speed detecting means, discriminating whether there has been any variation in the movement speed of the film and output a discrimination signal.

Also, said movement speed detecting means outputs a signal conforming to the movement speed of the film itself.

Also, said movement speed detecting means outputs a signal conforming to the rotational speed of said take-up spool for taking up the leader portion of the film, and said discriminating means receives the signal conforming to the rotational speed from said movement speed detecting means, discriminates whether there has been any variation in the rotational speed of said take-up spool and outputs a discrimination signal.

Further, provision is made of clutch means for connecting said film feeding means to a motor for driving said film feeding means, and said clutch means is disconnected in response to the discrimination signal output from said discriminating means.

The leader portion of the film fed from the film cartridge is automatically wound onto the take-up spool. By the leader portion of the film being wound onto the film take-up spool, a variation occurs in the movement speed of the leader portion of the film, and in conformity with this variation, a variation occurs in the signal output from the movement speed detecting means. Having discriminated the variation in this signal, the discriminating means outputs a discrimination signal indicative of the fact that there has been a variation in the movement speed of the leader portion of the film. Accordingly, it can be reliably discriminated that the leader portion of the film has been wounded onto the take-up spool.

To achieve the above objects, the film feeding apparatus in a camera according to the present invention is provided with an electric motor for driving film take-up means for rotatively driving a take-up spool at a speed higher than the feeding speed of film fed from a film cartridge to thereby wind the film with the leading end thereof brought into contact with and along the outer peripheral portion of said take-up spool, reference signal detecting means for outputting a pulse signal each time said motor is rotated by a predetermined amount, film movement amount detecting means for outputting a pulse signal each time the film is moved by a predetermined amount, and judgment means for judging with the generation period of the pulse signal from said reference signal detecting means as the reference whether the generation period of the pulse signal from said film movement amount detecting means has varied and judging that the generation period of said pulse signal has varied, thereby judging that the film has twined around said take-up spool.

According to the present invention, by the utilization of the fact that when effecting the automatic loading of the film, the feeding of the film from the cartridge side and the rotation of the take-up spool in the camera are effected at a time and moreover with a rotation difference so that the spool side may be rotated faster and the film arrives at the take-up spool and twines around it, whereby the film is pulled, the state in which the film twines around the spool is judged by the contrast between the pulse signal resulting from the amount of movement of the film and the reference pulse signal resulting from the rotation of the take-up spool driving motor.

BRIEF DESCRIPTION OF THE DRAWINGS

FIG. 5 is a flow chart in a second embodiment.

FIG. 7 is a diagram showing the circuit construction in the third embodiment.

FIG. 8 is a time chart in the third embodiment.

FIGS. 13A and 13B are characteristic graphs showing relations between a reference pulse signal and a pulse signal based on the movement of film.

DETAILED DESCRIPTION OF THE PREFERRED EMBODIMENTS

The present invention will hereinafter be described with reference to the drawings.

Figure 1:
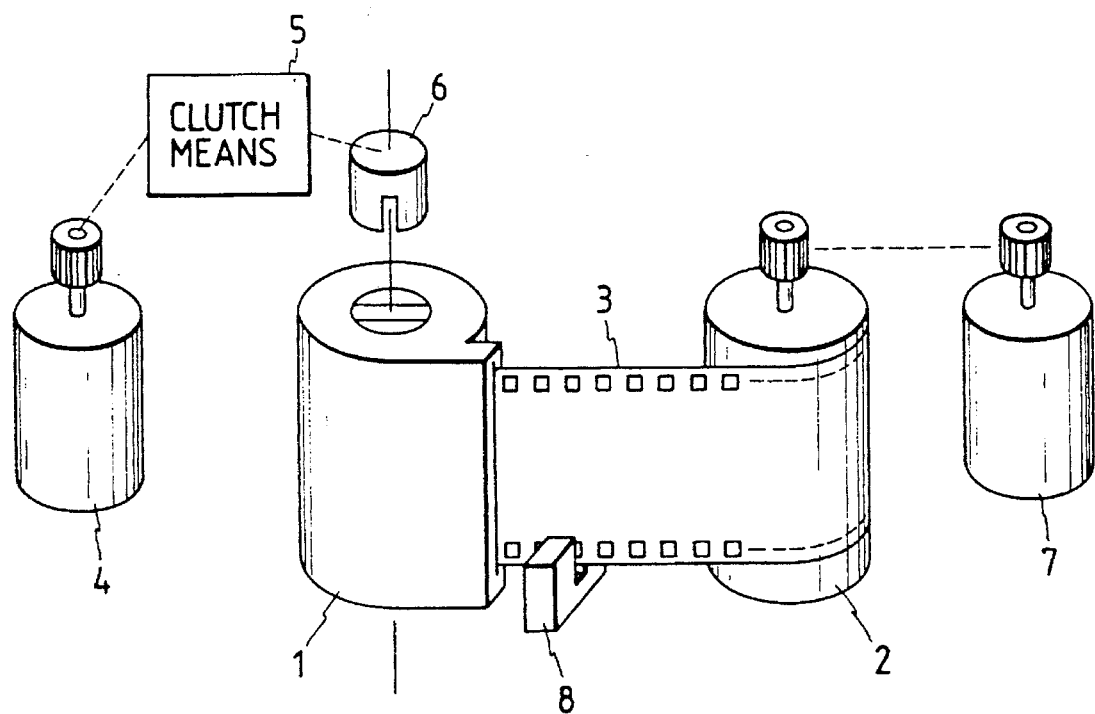
FIG. 1 is a perspective view showing a first embodiment of the film feeding apparatus of the present invention.
Figure 2:
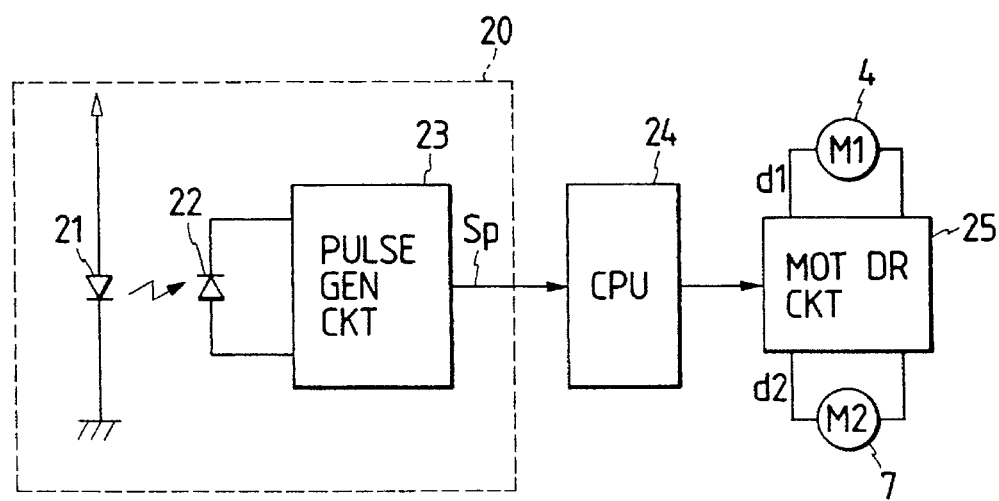
FIG. 2 is a diagram showing the circuit construction in the first embodiment.

FIG. 1 is a perspective view showing a first embodiment of the film feeding apparatus of the present invention, and FIG. 2 is a diagram showing the circuit construction in the first embodiment.

Referring to FIG. 1, a film cartridge 1 is designed such that the central shaft thereof on which film 3 is wound is rotated from outside to thereby feed the film 3, and more specifically, it is designed such that a coupling 6 engaged with the central shaft of the cartridge is rotated to thereby feed the film 3. A well-known gear train (not shown) including clutch means 5 is interposed between a motor 4 and the coupling 6, and the central shaft of the cartridge 1 is designed to rotate in response to the operations of the motor 4 and the gear train. A film take-up spool (hereinafter referred to as the take-up spool) 2 is for taking up the film 3 fed onto the spool, by a motor 7. A photointerrupter 8 is disposed so as to detect perforations in the film 3 being moved.

As shown in FIG. 2, the photointerrupter 8 has an LED 21 and a photodiode 22. A pulse generating circuit 23 which is a well-known photoelectric converting circuit receives the output signal of the photodiode 22 as an input and outputs a pulse signal Sp synchronized with the movement of the perforations. The LED 21, the photodiode 22 and the pulse generating circuit 23 as a whole are called pulse output means 20. The pulse signal Sp output from this pulse output means 20 is input to a CPU 24, in which it is subjected to processing which will be described later. The CPU 24 controls the aforementioned motor (M1) 4 and motor (M2) 7 through a motor driving circuit 25. The motor driving circuit 25 is adapted to drive the motor (M1) 4 and the motor 7 by a driving signal d1 and a driving signal d2 (M2), respectively.

Figure 3:
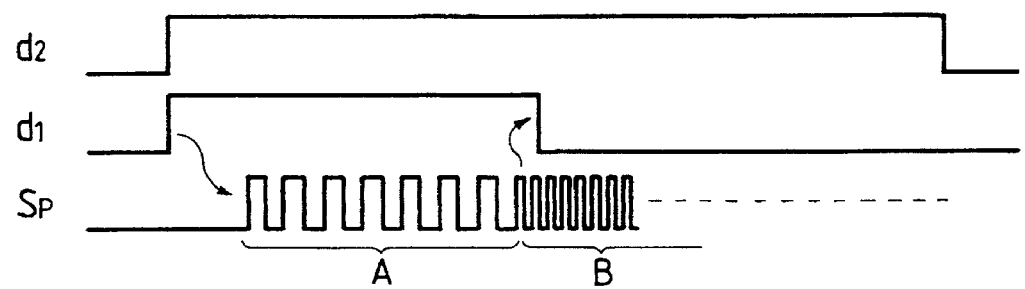
FIG. 3 is a time chart in the first embodiment.

FIG. 3 is a time chart showing the pulse signal Sp and the driving signals d2 and d1 in the first embodiment, and will hereinafter be described together with the flow chart of FIG. 4.

When it is first detected that the cartridge 1 has been loaded into a camera, the CPU 24 instructs the motor driving circuit 25 to drive the motors 4 and 7 (step 101). The detection of the loading of the cartridge 1 can be accomplished by a well-known method, for example, a method of loading the cartridge 1 into a camera and detecting the closing of the openable-closable lid (the back lid) of a cartridge chamber.

Having received said instruction to drive, the motor driving circuit 25 outputs driving signals d1 and d2 (FIG. 3), whereby the motor 4 is operated so as to feed the film 3 from the cartridge 1 through a gear train, not shown, while the motor 7 merely rotates the take-up spool 2 idly at this point of time. The film 3 fed from the cartridge 1 advances toward the take-up spool 2 and passes the photointerrupter disposed in the course of movement thereof. As a result, the pulse generating circuit 23 outputs a pulse signal Sp of a state (pulse width) as shown in the area A of FIG. 3. As the feeding of the film 3 progresses, the leading end of the film 3 arrives at the take-up spool 2. Since the take-up spool 2 is already rotating in the take-up direction, the film 3 is taken up by the take-up spool 2. Here, by the number of rotations R1 of the take-up spool 2 being preset so as to be greater than the number of rotations R2 of the central shaft of the cartridge 1 which effects the feeding of the film (R1>R2), the state of the pulse signal Sp transits from the area A to an area B as shown in FIG. 3. That is, with the transition from the area A to the area B, the pulse width of the pulse signal Sp transits to a short state.

Figure 4:
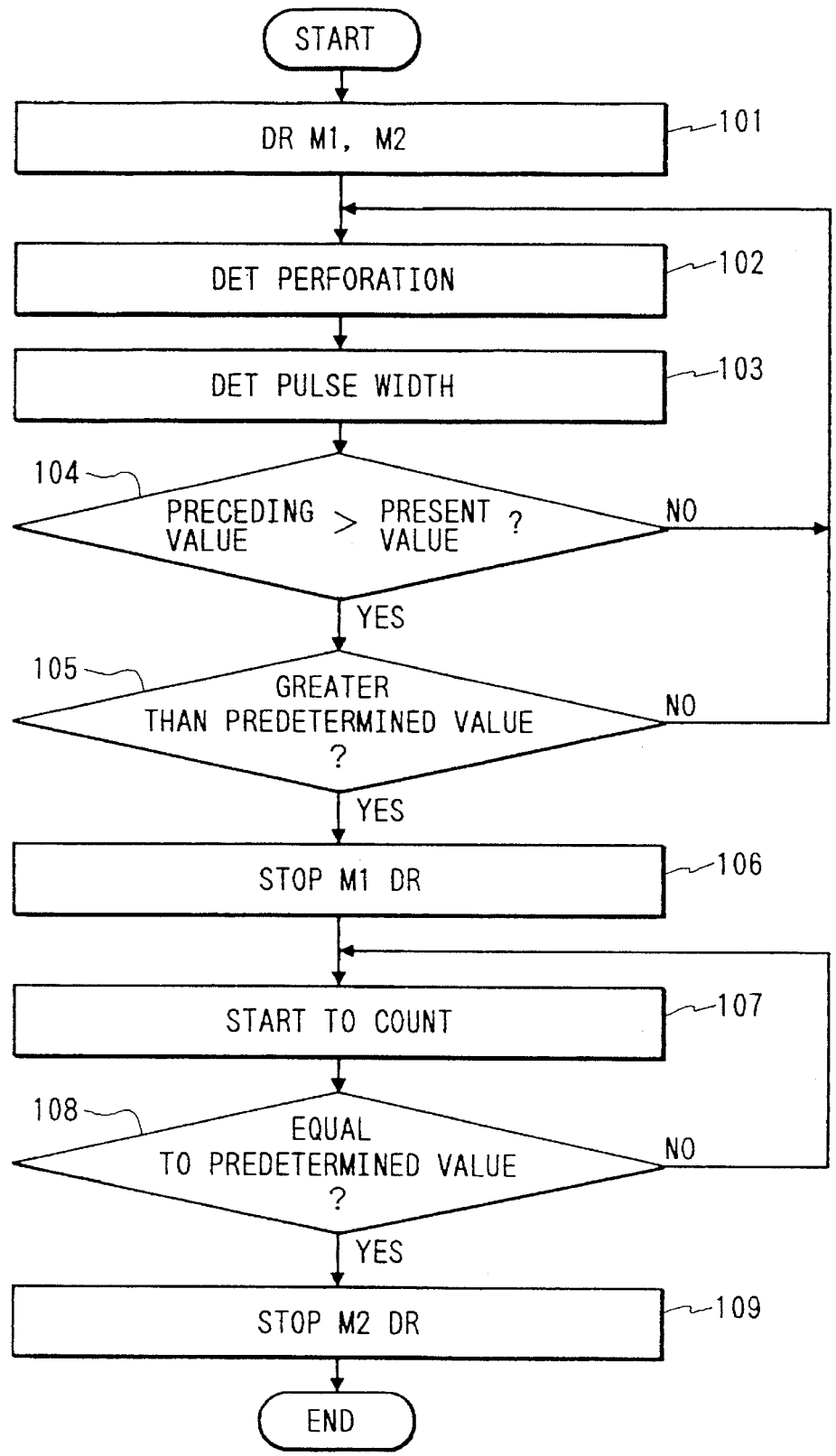
FIG. 4 is a flow chart in the first embodiment.

The steps 102–105 of FIG. 4 recognize the above-described transition phenomenon.

The pulse signal Sp generated in conformity with the movement of the perforations in the film 3 passing the photointerrupter 8 is detected (step 102), and the pulse width thereof is detected (step 103), and whether there has been any variation in this detected pulse width as compared with the pulse width of the preceding pulse, that is, whether there has been any variation in the movement speed of the perforations in the film 3, is judged, and if the answer is "N", that is, if there has been no variation, return is made to step 102, and if the answer is "Y", that is, if there has been a variation in the movement speed, advance is made to the next step 105 (step 104), where whether the amount of variation in the pulse width has exceeded a predetermined value is detected, and if the answer is "N", that is, if the amount of variation does not exceed the predetermined value, return is made to step 102, and if the answer is "Y", that is, if the amount of variation exceeds the predetermined value, advance is made to the next step (step 105).

The value of the amount of variation in the pulse width resulting from the transition from the area A to the area B is predetermined. For example, if the relation between the movement speed before the film 3 is taken up by the take-up spool 2 and the movement speed after the film 3 is taken up by the take-up spool 2 is preset to 1:2, a value corresponding to the difference between said two movement speeds is adopted as the predetermined value of the step 105.

When the transition from the area A to the area B is detected by the operation of the steps 102–105, a command for stopping the motor 4 is delivered from the CPU 24 to the motor driving circuit 25, which thus stops the outputting of the driving signal d1 to the motor 4 (FIG. 3), whereby the motor 4 is stopped (step 106). With the stoppage of the motor 4, the aforedescribed clutch means 5 operates and the motor 4 is disconnected from the coupling 6 and therefore, the motors 4 and 7 prevent from more than necessary load being applied to each other.

The motor 7 still rotates after the motor 4 is stopped and thus, the take-up spool 2 continues to take up the film. The detection of the perforations is continuedly effected and the counting of the perforations which have passed after the stoppage of the motor 4 is started (step 107). This is an operation for the so-called idle feeding of the film, and whether a pulse number corresponding to the amount of idle feeding of the film 3 has been counted is judged (step 108), and if the answer is "Y", that is, if said pulse number has been counted, the motor 7 is stopped and the taking-up of the film 3 by the take-up spool 2 is terminated (step 109), and if the answer is "N", that is, if said pulse number has not been counted, return is made to the step 107.

FIG. 5 is a flow chart showing a second embodiment to which the first embodiment described with reference to FIG. 4 is applied.

As in FIG. 4, the two motors are first driven (step 201) and a timer starts its counting operation (step 202).

Subsequently, whether the pulse signal Sp has been input from the pulse generating means 20 is judged (step 203), and the loop with step 204 is repeated until the pulse signal Sp is input. If the input of the pulse signal Sp is not obtained within a predetermined timer time, the motors 4 and 7 are both stopped (step 205). This shows that the film 3 could not pass the photointerrupter 8 due to some cause or other although an attempt was made to feed the film 3 from the cartridge 1, and provides a countermeasure for it.

If at the step 203, the pulse signal Sp is input normally, the time setting of the timer is changed and this timer is restarted (steps 206 and 207), and an operation similar to the steps 103–105 shown in FIG. 4 is performed and the state of movement of the film 3 is monitored (steps 208 and 209). As long as there is no variation in the state of movement of the film 3, a loop including a step 211 is repeated, and if any variation in the state of movement of the film 3 cannot be recognized within the time set in the timer, the driving of the motors 4 and 7 is stopped to terminate the operation (step 212). That is, this shows that although the fed film 3 could pass the photointerrupter 8, it has been detected that the film did not normally twine around the take-up spool 2 thereafter, and provides a countermeasure for it. Also, after a variation in the state of movement of the film 3 has been detected (step 210), the motor 4 is stopped (step 213), and an idle film feeding operation similar to the steps 107–109 of FIG. 4 is performed (step 214).

Figure 6:
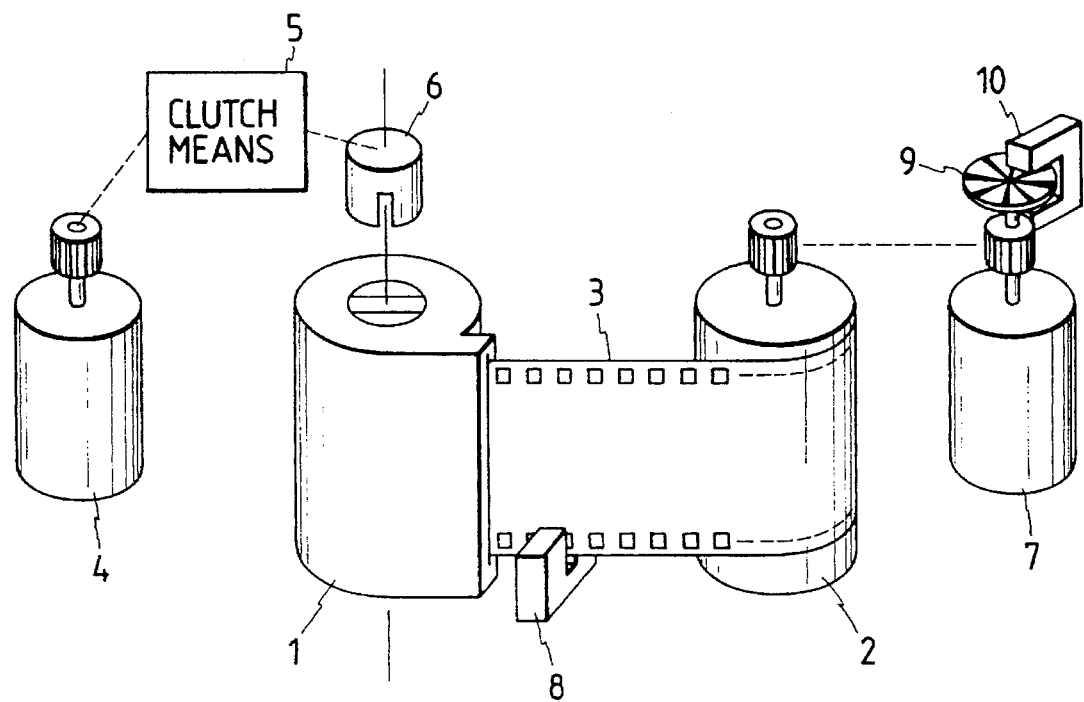
FIG. 6 is a perspective view showing a third embodiment.

Referring to FIG. 6 which is a perspective view showing a third embodiment, reference numerals identical to those in FIG. 1 designate identical or corresponding portions and these portions need not be described. FIG. 7 is a diagram showing the circuit construction in the third embodiment, and in FIG. 7, reference characters identical to those in FIG. 2 denote identical or corresponding portions and these portions need not be described.

In FIG. 6, the reference numeral 9 designates an encoder plate comprising a transparent circular plate radially divided into a predetermined number of areas and alternately provided with transmitting areas which transmit therethrough light projected from a photointerrupter 10 and non-transmitting are as which do not transmit therethrough such light. The encoder plate 9 is provided on the motor shaft of the motor 7. The photointerrupter 10 is designed to detect said transmitting areas and said non-transmitting areas in conformity with the rotation of the encoder plate 9 to thereby detect the rotated state of the motor 7.

In the third embodiment, the detection of the rotated state of the motor 7 is shown as being directly obtained from the encoder plate 9 provided on the motor shaft, whereas this is not restrictive, but design may of course be made such that the rotated state of the motor 7 is detected from the take-up spool 2 or a mechanism provided between the take-up spool 2 and the motor 7.

The detection of the movement of the film 3 is effected by the photointerrupter 8 as in the first embodiment.

In FIG. 7, the photointerrupter 10 of FIG. 6 is indicated by an LED 26a and a photodiode 26b. A pulse generating circuit 26c which is a well-known photoelectric converting circuit receives the output signal of the photodiode 26b as an input and outputs a pulse signal Sp' synchronized with the rotation of the encoder plate 9. The LED 26a, the photodiode 26b and the pulse generating circuit 26c as a whole is called pulse output means 26. The pulse signal Sp' from this pulse output means 26 is input to a CPU 24, in which it is subjected to processing which will be described later.

Figure 9:
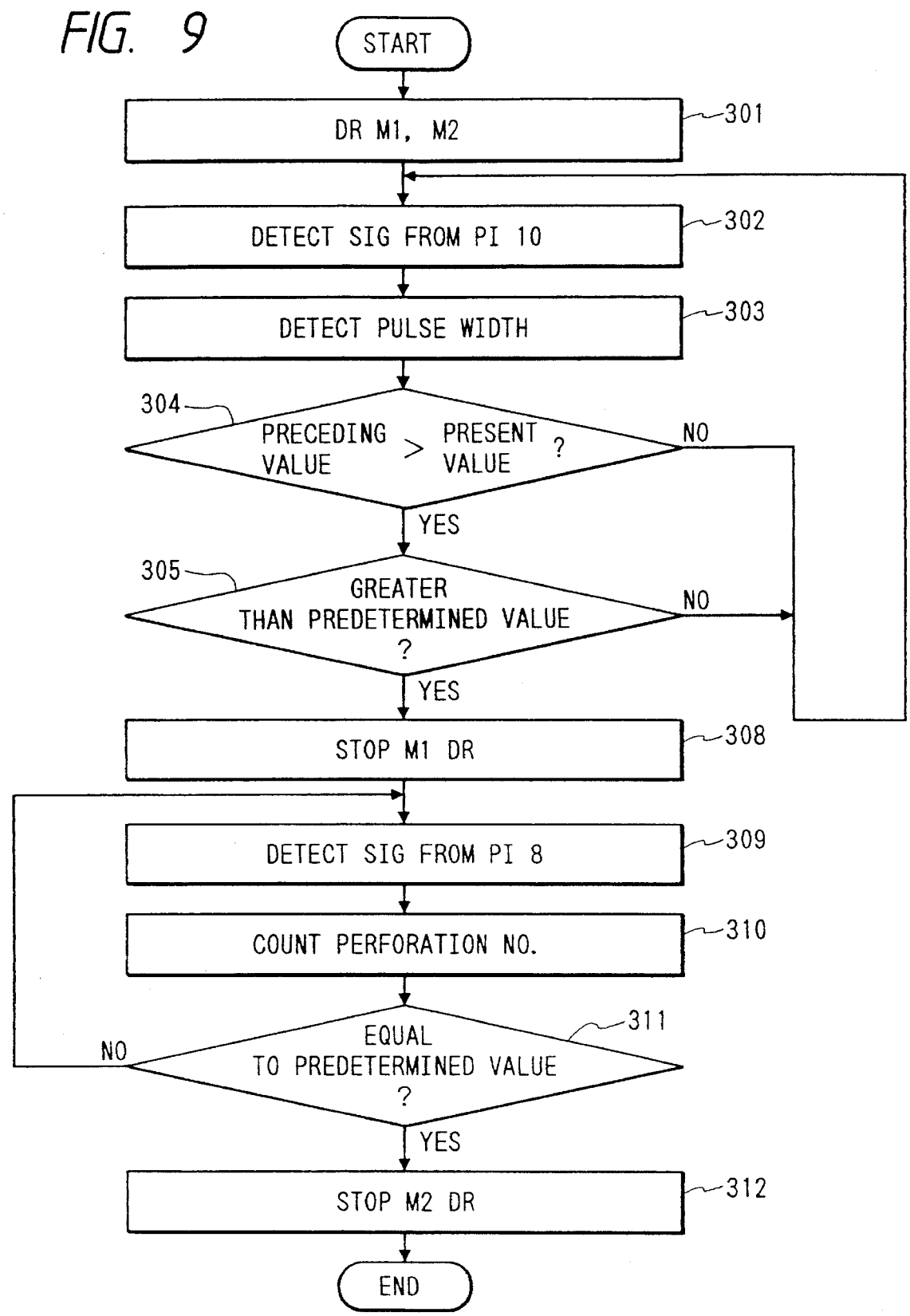
FIG. 9 is a flow chart in the third embodiment.

FIG. 8 is a time chart showing the third embodiment, and will hereinafter be described together with a flow chart shown in FIG. 9.

When it is first detected that the cartridge 1 has been loaded into a camera, the CPU 24 instructs the motor driving circuit 25 to drive the motors 4 and 7 (step 301). Having received this instruction for driving the motors, the motor driving circuit 25 outputs driving signals d1 and d2 (FIG. 8), whereby the motor 4 operates so as to feed the film 3 from the cartridge 1, while the motor 7 merely rotates the take-up spool 2 idly at this point of time. Also, with the start of the rotation of the motor 7, the encoder plate 9 rotates and therefore, the pulse generating means 26 outputs the pulse signal Sp' on the basis of the detection signal of the photointerrupter 10 (FIG. 8). That is, the pulse signal Sp' appears simultaneously with the start of the rotation of the motor 7.

On the other hand, the film 3 fed from the cartridge 1 advances toward the take-up spool and passes the photointerrupter 8 disposed in the course of movement thereof. As a result, the pulse output means 20 outputs a pulse signal Sp as shown in FIG. 8. As the feeding of the film 3 progresses further, the leading end of the film 3 arrives at the take-up spool 2. Since the take-up spool 2 is already rotating in the take-up direction, the film 3 is taken up by the take-up spool 2. By the number of rotations R1 of the take-up spool 2 being preset so as to be greater than the number of rotations R2 of the central shaft of the cartridge 1 effecting the feeding of the film (R1>R2), the state of the pulse signal Sp' transits from the area A to the area B as shown in FIG. 8. That is, with the transition from the area A to the area B, the pulse width of the pulse signal Sp' transits to a long state. That is, when the film 3 twines around the take-up spool 2, a load is applied to the take-up spool 2 which has so far been rotated in a no-load state and thus, there occurs a variation for reducing the number of rotations and by detecting this variation, the twining of the film 3 around the take-up spool is judged.

Steps 302–305 recognize the above-described transition phenomenon.

The pulse signal Sp' output in conformity with the number of rotations of the motor 7 detected by the photointerrupter 10 is detected (step 302), and the pulse width thereof is detected (step 303), and whether there has been any variation in the rotated state of the motor 7 with the detected pulse width compared with the pulse width of the preceding pulse, that is, whether there has been any variation in the number of rotations of the motor 7, is judged (step 304), and if the answer is "N", that is, if there has been no variation, return is made to the step 302. If the answer is "Y", that is, if there has been a variation, whether the amount of variation in the detected pulse width is equal to or greater than a predetermined value is judged (step 305). The value of the amount of variation in the pulse width resulting from the transition from the area A to the area B is predetermined. That is, if the pulse width when the motor 7 is rotated under no-load condition and the pulse width after the film 3 is taken up by the take-up spool 2, that is, when the motor 7 is rotated with a load applied thereto, are preset to appropriate values, a value corresponding to the difference between said two pulse widths is adopted as the predetermined value at the step 305. If at the step 305, the answer is "N", that is, the amount of variation is not equal to or greater than the predetermined value, return is made to the step 302, and if the answer is "Y", that is, the amount of variation is equal to or greater than the predetermined value, the motor driving circuit 25 stops the supply of the driving signal d1 to the motor 4 (FIG. 8), whereby the motor 4 is stopped (step 308). With the stoppage of the motor 4, the aforedescribed clutch means 5 operates and the motor 4 is disconnected from the coupling 6 and therefore, the motors 4 and 7 prevent more than necessary load from being applied to each other.

The take-up spool 2 still continues to take up the film 3 after the motor 4 is stopped, and with the stoppage of the motor 4, the counting of the perforations in the film 3 is started (steps 309 and 310). This is an operation for idle feeding, as previously described, and whether a pulse number corresponding to the amount of idle feeding of the film 3 has been counted is judged (step 311), and if the answer is "Y", that is, if the counting of a predetermined pulse number is completed, the supply of the driving signal d2 from the motor driving circuit 25 to the motor 7 is stopped (FIG. 8), and the taking-up of the film 3 by the take-up spool 2 is terminated (step 312), and if the answer is "N", that is, if the counting of the predetermined pulse number is not completed, return is made to the step 309.

In the present embodiment, discrete motors are used for feeding and taking up the film, respectively, whereas this is not restrictive, but of course, a single motor may be used for the two purposes.

As described above, according to the film feeding apparatus of the present invention, the movement speed of the leader portion of the film is varied by the leader portion of the film twining around the film take-up spool, and the signal output from the movement speed detecting means in conformity with this variation is varied. Having discriminated the variation in this signal, the discriminating means outputs a discrimination signal indicative of the fact that there has been a variation in the movement speed of the leader portion of the film. Accordingly, it can be easily detected that the leader portion of the film has twined around the film take-up spool.

The present invention will further be described in detail with respect to another embodiment thereof shown in the drawings.

Figure 10:
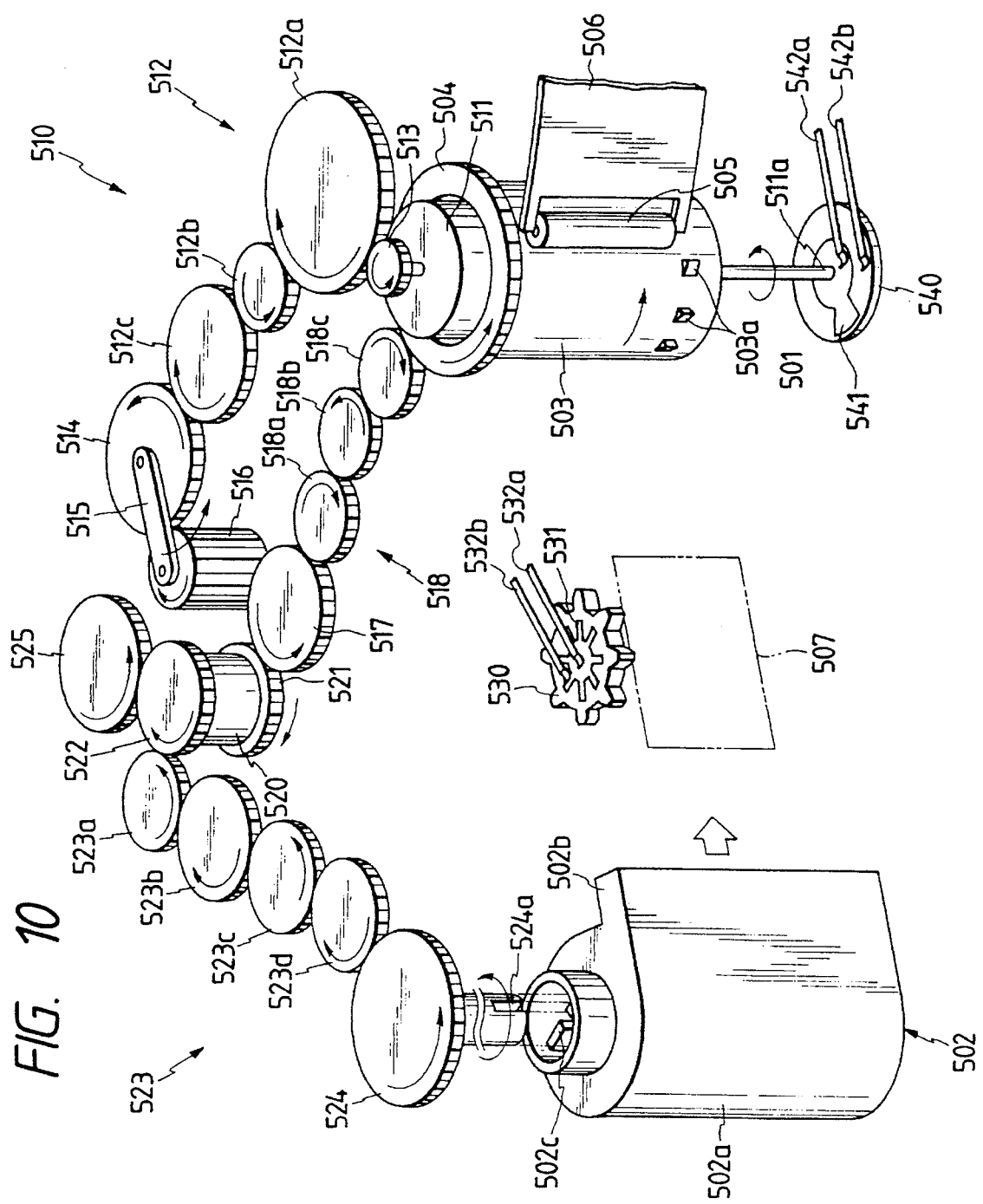
FIG. 10 is a schematic perspective view showing the construction of the essential portions of a fourth embodiment of the film feeding apparatus according to the present invention.
Figure 11:
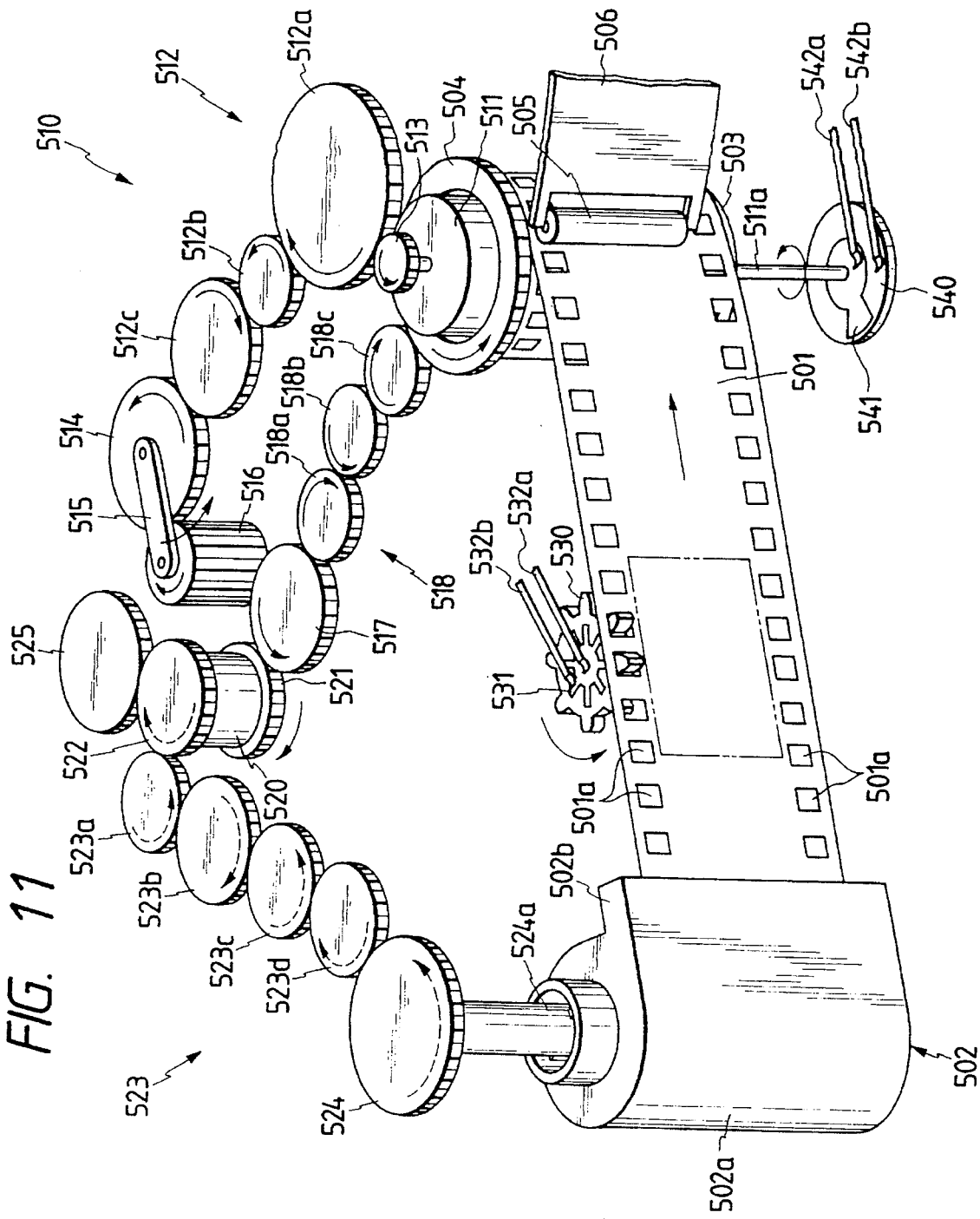
FIGS. 11 and 12 illustrate the operations of the FIG. 10 apparatus during film feeding and winding and during film rewinding.
Figure 12:
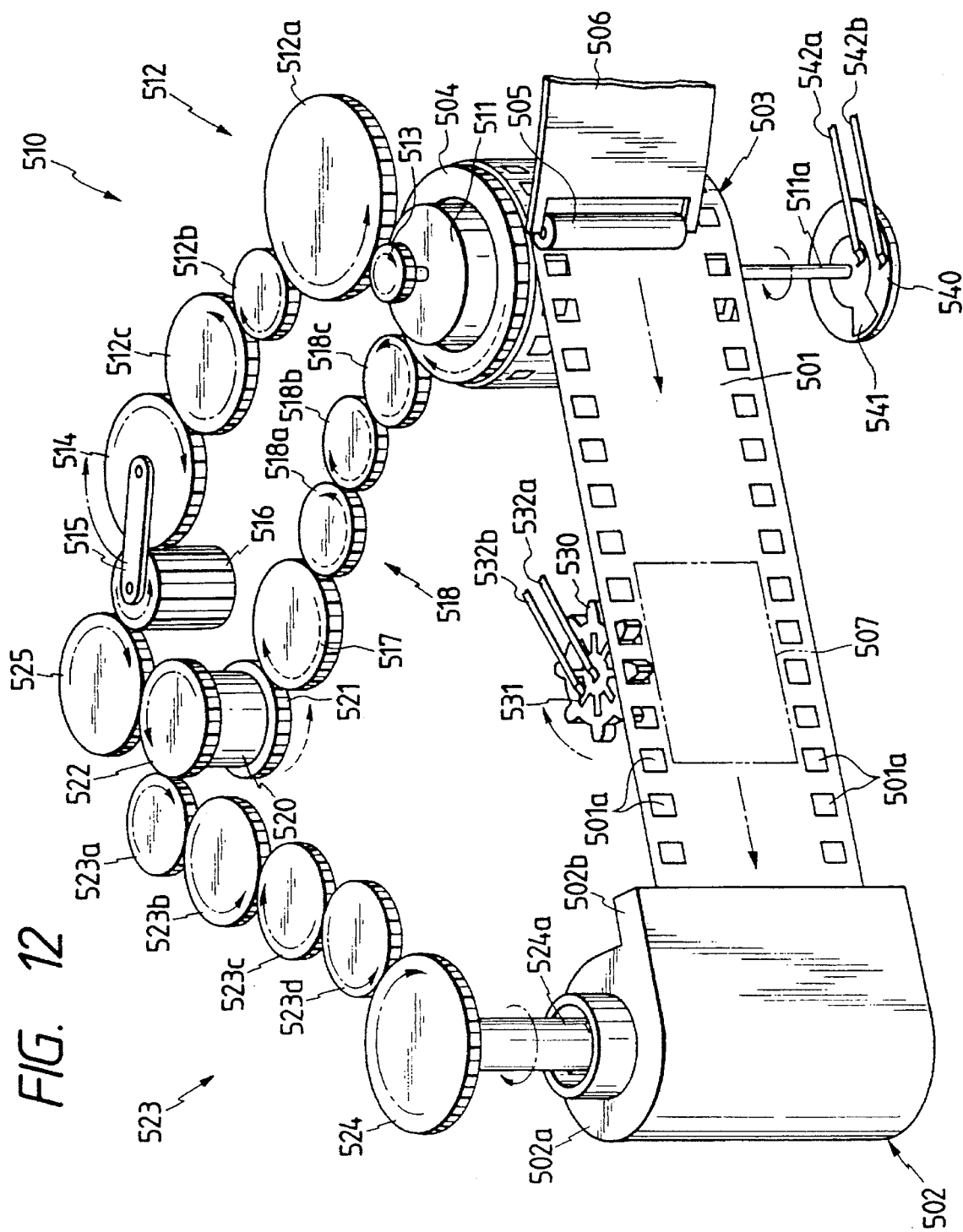
Figure 19:
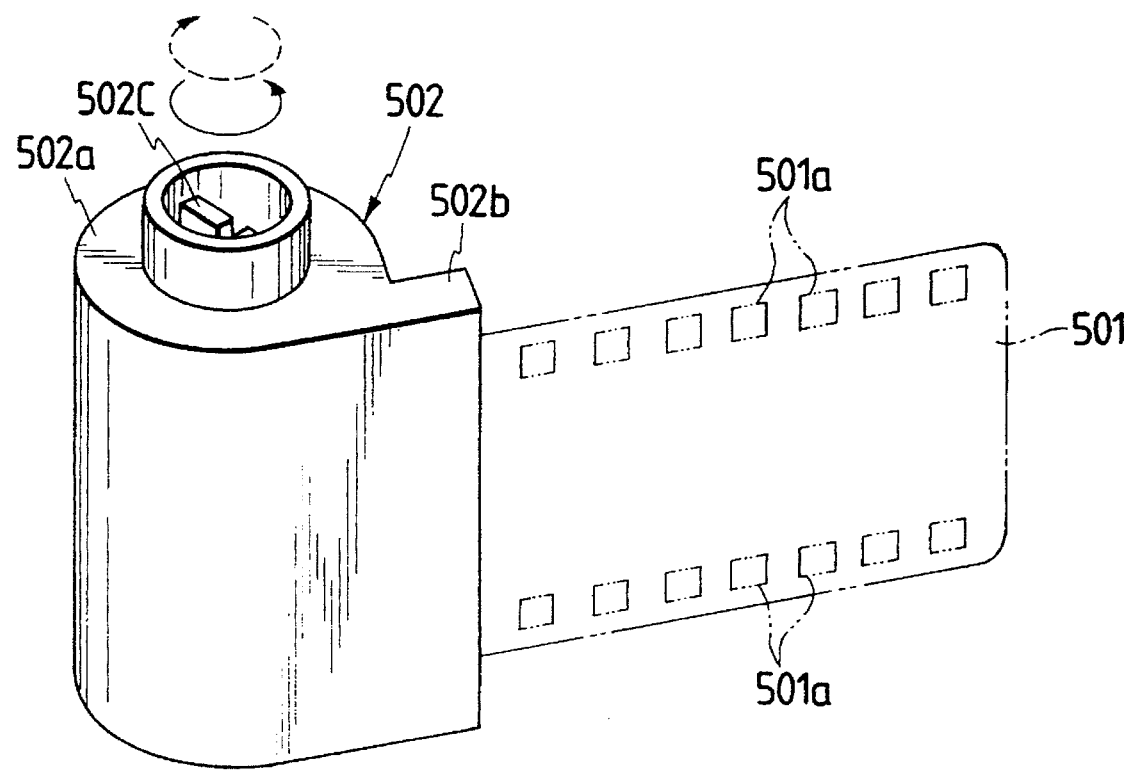
FIG. 19 is a schematic perspective view of a film cartridge used in the present invention.

FIGS. 10 to 12 show a fourth embodiment of the film feeding apparatus according to the present invention. In these figures, portions identical to those in FIG. 19 are given identical reference characters and need not be described. In the figures, the reference numeral 503 designates a film take-up spool provided in a camera body, not shown, in opposed relationship with a cartridge 502. Pawl portions 503a for meshing with lower perforations 501a in film 501 are projectedly provided on the outer peripheral portion of the film take-up spool 503, and a take-up spool driving gear 504 which receives the transmission of rotation in the film winding-up direction during the winding-up of the film is provided integrally with the film take-up spool, and winds up and moves the film 501 in the feeding direction. The reference numeral 505 denotes a keep roller brought into contact with the outer peripheral portion of the take-up spool 503 for introducing the film 501 from the cartridge 502 side, the reference numeral 506 designates a holding plate for holding the keep roller 505 and urging the roller 505 against the spool 503 side by biasing means, not shown, and the reference numeral 507 denotes an aperture in the camera body for directing photographed images to the film 501 fed from the cartridge 502 to the take-up spool 503 side.

The film feeding apparatus generally designated by 510 is designed such that an automatic loading operation in which the film 501 is fed from the cartridge 502 of the type in which the leading end of the film 501 is not exposed out of the feeding portion 502b and is wound onto the take-up spool is performed and the film 501 is wound up frame by frame and when photographing is terminated, the spool shaft of the cartridge 502 is rotated so as to rewind the film 501, and in the present embodiment, it is provided with an electric motor 511 disposed as a drive source within the take-up spool 503 or the like. The reference numeral 512 designates a rotation transmitting gear train for transmitting the rotation of the motor 511 from a motor shaft gear 513 to a sun gear 514 through gears 512a–512c. A lever arm 515 given a friction habit by a friction spring, not shown, is pivotally supported on the sun gear 514 and a planet gear 516 meshing with the sun gear 514 is rotatably supported on the pivotally movable end of the lever arm 515. During the automatic loading operation and the film winding-up operation shown in FIGS. 10 and 11, the planet gear 516 meshes with a transmission gear 517 by the lever arm 515 being pivotally moved with the rotation of the sun gear 514 in the direction of arrow indicated by a solid line in the figures so that through the gear 517, the rotation may be transmitted to the driving gear 504 on the take-up spool 503 side by gears 518a–518c constituting a film take-up side rotation transmitting gear system 518. Although not shown, there is provided a stopper for regulating the pivotal movement of the lever arm 515 in the meshing position of the planet gear 516 with respect to the gear 517.

On the other hand, the transmission gear 517 is also in meshing engagement with the lower gear 521 of a one-way clutch 520 of well-known construction, as shown in FIG. 10, and the upper gear 522 of the clutch 520 selectively connected to the lower gear 520 is connected so as to be capable of transmitting the rotation to a film driving side gear 524 for rotatively driving the spool shaft of the cartridge 502 through gears 523a–523d constituting a film feeding side rotation transmitting gear train 523. The driving gear 524 has a film driving key 524a at the gear shaft end thereof engaged with a spline portion 502c for rotating the spool shaft, and is rotatively driven in the direction of arrow indicated by a solid line in FIG. 10 during the feeding of the film from the cartridge 502 loaded in a camera, and is rotatively driven in the direction of arrow indicated by a dot-and-dash line in FIG. 12 when the film 501 is rewound into the cartridge 502. Although in FIG. 10, the film driving key 524a which is means for transmitting the rotation of the driving gear 524 to the spool shaft is shown to be not in engagement with the spline portion 502c, the driving key 524a side is extended in the axial direction and is movably constructed as shown by a phantom line so that the driving key may come into engagement with the spline portion 502c when the cartridge 502 is loaded into the camera.

The above-mentioned one-way clutch 520 is designed such that the rotative driving force is transmitted from the lower gear 521 to the upper gear 522 only when the rotational speed of the upper gear 522 in the direction of solid-line arrow in FIG. 10 becomes lower than the rotational speed of the lower gear 521 in the direction of arrow and that the transmission of the driving force from the lower gear 521 to the upper gear 522 cannot take place when the rotational speed of the upper gear 522 in the direction of arrow is higher than the rotational speed of the lower gear 521 in the direction of arrow. The one-way clutch is also designed such that the rotation is not transmitted from the upper gear 522 to the lower gear 521 when the rotational speed of the upper gear 522 in the direction opposite to the direction of solid-line arrow in FIG. 10 is higher than the rotational speed of the lower gear 521 in the direction opposite to the direction of arrow in FIG. 10.

When the film 501 is to be fed from the cartridge 502, the rotational speed of the upper gear 522 is zero and as a matter of course, is lower than the rotational speed of the lower gear 521 and therefore, the lower and upper gears 521 and 522 are connected together by the one-way clutch 520 and thus, the transmission of the rotation from the motor 511 side is effected in the direction indicated by a solid-line arrow in FIG. 10 and the film driving gear 524 is rotated through the rotation transmitting gear system 523 on the film feeding side, whereby the feeding of the film 502 is accomplished.

On the other hand, the reference numeral 525 denotes a transmission gear which is mesh-engaged by the planet gear 516 as shown in FIG. 12 by the lever arm 515 being pivotally moved in the direction of arrow indicated by a dot-and-dash line in the figure by the rotation of the sun gear 514 in the direction of arrow indicated by a dot-and-dash line in the figure during the film rewinding from the take-up spool 503 side, and design is made such that by the transmission gear 525, the rotation of the motor 511 is transmitted to the film driving gear 524 through the upper gear 522 and the rotation transmitting gear train 523 and the rotation of the film driving gear 524 in the direction indicated by a dot-and-dash line in FIG. 12 causes the spool shaft of the cartridge 502 to rotate in the rewinding direction to thereby introduce the film 501 into the cartridge 502. There may preferably be provided a stopper for regulating the pivotal movement of the above-described lever arm 515 in a predetermined position.

The above-described rotation of the upper gear 522 is transmitted to the lower gear 521 through the one-way clutch 520, and is transmitted from the transmission gear 517 to the driving gear 514 through the gear train 518 on the film take-up side, whereby the take-up spool 503 is rotated in the direction of arrow indicated by a broken line in the figure. At this time, the film 501 is being rewound by the spool shaft of the cartridge 502 being rotated in the direction of arrow indicated by a dot-and-dash line in the figure by the film driving gear 524, but since as will be described later, the rotational speed of the spool 503 transmitted by the gear train 518 on the take-up-side is higher than the rewinding speed of the film 501 into the cartridge 502 by the gear train 523 on the film feeding side, the film 501 is loosened on the spool 503 side and the rotation of the spool 503 does not affect the movement of the film 501. The film 501 is thus rewound into the cartridge 502 by the rotation of the film driving gear 524.

The reference numeral 530 designates a free sprocket which provides film movement speed detecting means disposed so as to mesh with the upper perforations 501a in the film 501 fed from the feeding port of the cartridge 502, and design is made such that the movement speed of the film 501 is detected from the amount of rotation of this sprocket 530. That is, the upper surface of the sprocket 530 is formed with a conductor pattern 531, and a pair of brushes 532a and 532b are adapted to come into and out of contact with the pattern 531 with the rotation of the sprocket, whereby a predetermined amount of rotation of the sprocket 530, i.e., the movement speed of the film 501, is detected. One brush 532a is normally in contact with the pattern 531 and the other brush 532b contacts with the pattern 531 each time the sprocket 530 rotates, thereby repeating a signal indicative of the closing and opening of a switch, and therefore, it will be readily understood that if this is detected and calculated by a calculation circuit or the like, the amount of movement, i.e., the movement speed, of the film 501 will be found. In the illustrated embodiment, there is shown a case where a plurality of pulses are delivered for each one full rotation, but of course, there may be adopted such a pattern shape that one pulse is delivered.

Design is also made such that the film 501 fed out from the cartridge 502 is fed through a well-known path called a tunnel comprising inner and outer rail portions and a film pressing plate, not shown, and passes through the aperture 507 prescribing the photographing picture plane on its way and the above-described sprocket 530 to the outer peripheral portion of the take-up spool 503, and is taken up while being kept down by the keep roller 505 provided with a biasing spring. That is, when the film 501 arrives at the outer peripheral portion of the spool 503, the film 501 comes into the nip between the spool 503 and the roller 505 by the rotation of the spool 503 and the feeding-out of the film 501 from the cartridge 502 side, whereby the taking-up operation as previously described can be effected.

In the present embodiment, the reduction gear ratio of the gear train 518 on the take-up side to the gear train 523 on the film feeding-out side is set such that the rotational speed of the spool 503 side is about three times higher than the rotational speed of the feeding-out side for the film 501, whereby the movement speed of the film 501 when the film 501 is wound on the spool 503 becomes higher than that before the film is taken up. The film 501 thus wound on the spool 503 is drawn out of the cartridge 502 by the rotation of the spool 503, whereby the film driving gear 524, the rotation transmitting gear train 523 and the upper gear 522 are accelerated and rotated by the rotation of the spool 503 side. Thereupon, the rotation of the upper gear 522 of the one-way clutch 520 becomes faster than the lower gear 521 of the one-way clutch 520 and as a result, the one-way clutch 520 is disconnected and the transmission of the rotation from the lower gear 521 to the upper gear 522 is no longer effected. Such drawn-out state of the film 501 from the cartridge 502, i.e., the taken-up state of the film on the spool 503 side, is shown in FIG. 11.

It will be readily understood that this film feeding state is detected by a switch being closed and opened by detecting means attached to the sprocket 530 in FIG. 11. According to this detecting means, it becomes possible to find the amount of feed corresponding to one frame of the film 501 by inputting to a calculation circuit the output of a switch comprised of the conductor pattern 531 and brushes 522a, 532b on the sprocket 530 and calculating said output.

Such detection of the moving state of the film 501 is also similar during the above-described film rewinding as shown in FIG. 12, and the film 501 passes the position of the sprocket 530 which is the detecting means and the sprocket stops its rotation, that is, the output signal by the closing and opening of the switch becomes null, whereby the rewound state of the film 501 can be detected. Accordingly, if the rotation of the motor 511 is stopped after a predetermined time has elapsed after such variation in the output has occurred, the film 501 will become completely rewound into the cartridge 502.

Now, in the film feeding apparatus of the above-described construction, when effecting the automatic loading operation of feeding out the film 501 from the cartridge 502 to the take-up spool 503 side, judgment as to whether the film 501 has twined around the take-up spool 503 can be done by detecting the movement speed of the film 501 by the aforedescribed switch provided by the sprocket 530, and detecting that the movement speed has increased. That is, the present invention has a feature in that in the apparatus 510 of the above-described construction, provision is made of a rotation detecting plate 540 which provides reference signal detecting means outputting a pulse signal each time the driving electric motor 511 utilizing a variation in the movement speed of the film 501 to rotatively drive the take-up spool 503 at a speed higher than the feed-out speed of the film 501 fed out from the cartridge 502 to thereby wind the leading end of the film 501 around and along the outer peripheral portion of the take-up spool 503 is rotated by a predetermined amount, the free sprocket 530 which is film movement amount detecting means outputting a pulse signal each time the film 501 is moved by a predetermined amount, and judgment means (a microcomputer 550 shown in FIG. 14) for judging with the generation period of the pulse signal from the rotation detecting plate 540 for reference signal detection as the reference whether the generation period of the pulse signal from the free sprocket 530 for film movement amount detection has varied, and that as is apparent from FIGS. 13A and 13B, it is judged that the generation period f of said pulse signal has varied, whereby it is judged that the film 501 has twined around the take-up spool 503.

The rotation detecting plate 540 which provides the reference pulse signal detecting means provided on the motor shaft 511a of the motor 511 and formed with a conductor pattern 541 and a pair of brushes 542a and 542b which are in contact with the conductor pattern 541 and detect the rotation of the motor 511 together constitute reference signal detecting means which delivers a reference signal by the switch being closed and opened by the rotation of the motor 511. That is, by this pulse number being counted, the rotational speed of the motor 511 can be detected, and the reference pulse signal by this motor 511 is shown at (I) in FIGS. 13A and 13B. On the other hand, the pulse signal resulting from the movement speed of the film 501 by the free sprocket 530 is shown at (II) in FIGS. 13A and 13B, and it will be readily understood that variations in the generation period f of the pulse signal at these (I) and (II) are compared with each other, whereby whether the movement speed of the film 501 has become higher can be detected. The situation in which the pulse signal is generated by the meshing engagement of the free sprocket 530 with the perforations 501a from after the start of the feeding-out of the film 501 from the cartridge 502 is shown at (II) in FIG. 13A, and the situation in which the pulse signal is generated when from the situation shown in FIG. 13A, the film 501 twines around the take-up spool 503 and is pulled and moved at a high speed by the rotation of the spool 503 is shown at (II) in FIG. 13B, and the generation period f of the signal varies with the generated signal on the motor 511 side as the reference.

Particularly, if the reference pulse signal is thus obtained on the basis of the amount of rotation of the motor 511 and the generation period f of the pulse signal generated on the basis of the movement speed of the film 501 is compared to thereby detect the twining of the film 501 around the spool 503, there is the advantage that even when the rotational speed of the motor 511 is fluctuated by various load fluctuations, any variation in the movement speed of the film based on the film feeding operation driven by the motor 511 can be detected appropriately and reliably.

In other words, the present invention skillfully utilizes, in effecting the automatic loading of the film 501, the fact that the feeding-out of the film from the cartridge 502 and the rotation of the take-up spool 503 in the camera are effected at a time and with a rotation difference so that the spool 503 side may be faster and the film 501 arrives at and twines around the take-up spool 503 and is pulled thereby, and the state of the film 501 twining around the spool 503 can be judged in contrast of the pulse signal resulting from the amount of movement of the film 501 with the reference pulse signal resulting from the rotation of the take-up spool driving motor 511, irrespective of the fluctuation of the rotational speed of the motor.

Also, according to the present invention, the cartridge 502 used is of such a construction that the spool shaft thereof is rotated in the feeding-out direction to thereby feed the film 501 out of the feeding-out port, and the rotation transmitting system (512, 523) which effects the transmission of the rotation from the electric motor 511 for rotatively driving the take-up spool 503 is connected to the spool shaft of the cartridge 502, and also the one-way clutch 520 as a clutch for cutting off the transmission of the rotation when the judgment means discriminates a variation in the signal generation period is provided in the rotation transmitting system and therefore, a wasteless film feeding operation can be obtained by a single motor 511 and there is also the advantage that the load to the motor 511 can be minimized.

The driving circuit and operation sequence in the film feeding apparatus 510 of the above-described construction will hereinafter be described briefly with reference to FIGS. 14 to 18.

Figure 14:
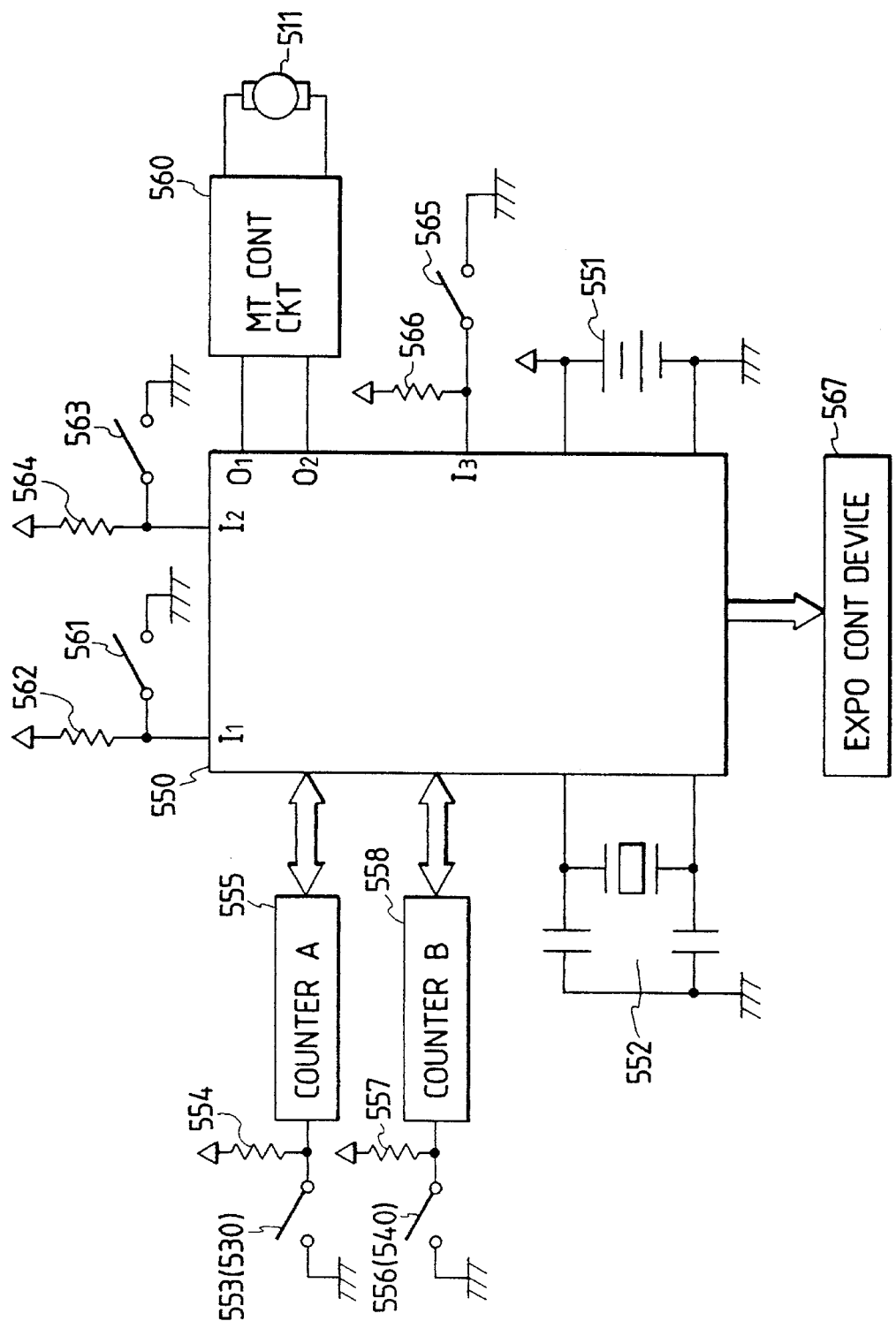
FIG. 14 is a block diagram of a circuit for effecting the operation of the apparatus.

Referring to FIG. 14 which is a block diagram of a circuit for effecting various operations, the reference numeral 550 designates a microcomputer (hereinafter referred to as the CPU), and the reference numeral 551 denotes a battery for supplying electric power thereto, and design is made such that clock pulses necessary for various calculations and time counting are obtained from a reference oscillation source 552 and a transmission circuit, not shown, which is contained in the CPU 550.

The reference numeral 553 designates a film movement detecting switch comprised of the conductor pattern 531 and brushes 532a and 532b provided on the free sprocket 530 for detecting the movement speed of the film. One end of the switch 553 is grounded and the other end of the switch 553 is connected to the battery side through a pull-up resistor 554 and is also connected to a counter A denoted by 555 in FIG. 14. This counter A is designed to detect and count up the falling of the output signal of the film movement detecting switch 553 and also reset the count value to 0 by the command of the CPU 550.

The reference numeral 556 denotes a motor rotation detecting switch comprised of the conductor pattern 541 and brushes 542a and 542b of the aforedescribed rotation detecting plate 540 for detecting the reference pulse signal. One end of the switch 556 is grounded and the other end of the switch 556 is connected to the battery side through a pull-up resistor 557 and is also connected to a counter B designated by 558 in FIG. 14. This counter B is designed to detect and count up the falling of the output signal of the motor rotation detecting switch 556 and also reset the count value to 0 by the command of the CPU 550.

The reference numeral 560 designates a motor control circuit for controlling the rotation of the electric motor 511 which is the drive source of the film feeding apparatus 510. The motor control circuit 560 rotates the motor 511 in the direction of solid-line arrow in FIG. 10 when only one output port $O_1$ of the CPU 550 assumes a high level, and rotates the motor 511 in the direction of dot-and-dash line arrow in FIG. 12 when only the other output port $O_2$ of the CPU 550 assumes a high level, and stops the rotation of the motor 511 when both of these output ports $O_1$ and $O_2$ are at a low level. Description will hereinafter be made with it being understood that the rotation of the motor 511 during the film feeding and winding-up in FIG. 10 is forward rotation and the rotation of the motor 511 during the film rewinding in FIG. 12 is backward rotation.

The reference numeral 561 denotes a cartridge detecting switch for detecting the loading of the cartridge 502 into the camera by the movement of detecting means, not shown. One end of the switch 561 is grounded and the other end of the switch 561 is connected to the battery side through a pull-up resistor 562 and is also connected to the input port $I_1$ of the CPU 550. The reference numeral 563 designates a cartridge cover detecting switch adapted to be closed by a detecting member (not shown) operated by a cartridge cover (not shown) being closed after the loading of the cartridge 502. One end of the switch 563 is grounded and the other end of the switch 563 is connected to the battery side through a pull-up resistor 564 and is also connected to the input port $I_2$ of the CPU 550. The reference numeral 565 denotes a release switch adapted to be closed in response to the depression of a release button, not shown. One end of the release switch 565 is grounded and the other end of the release switch 565 is connected to the battery side through a pull-up resistor 566 and is also connected to the input port $I_3$ of the CPU 550.

The reference numeral 567 designates an exposure control device such as the shutter, stop or aperture control device of the camera. The exposure control device 567 controls the shutter speed or the aperture by a command from the CPU 550.

Figure 15:
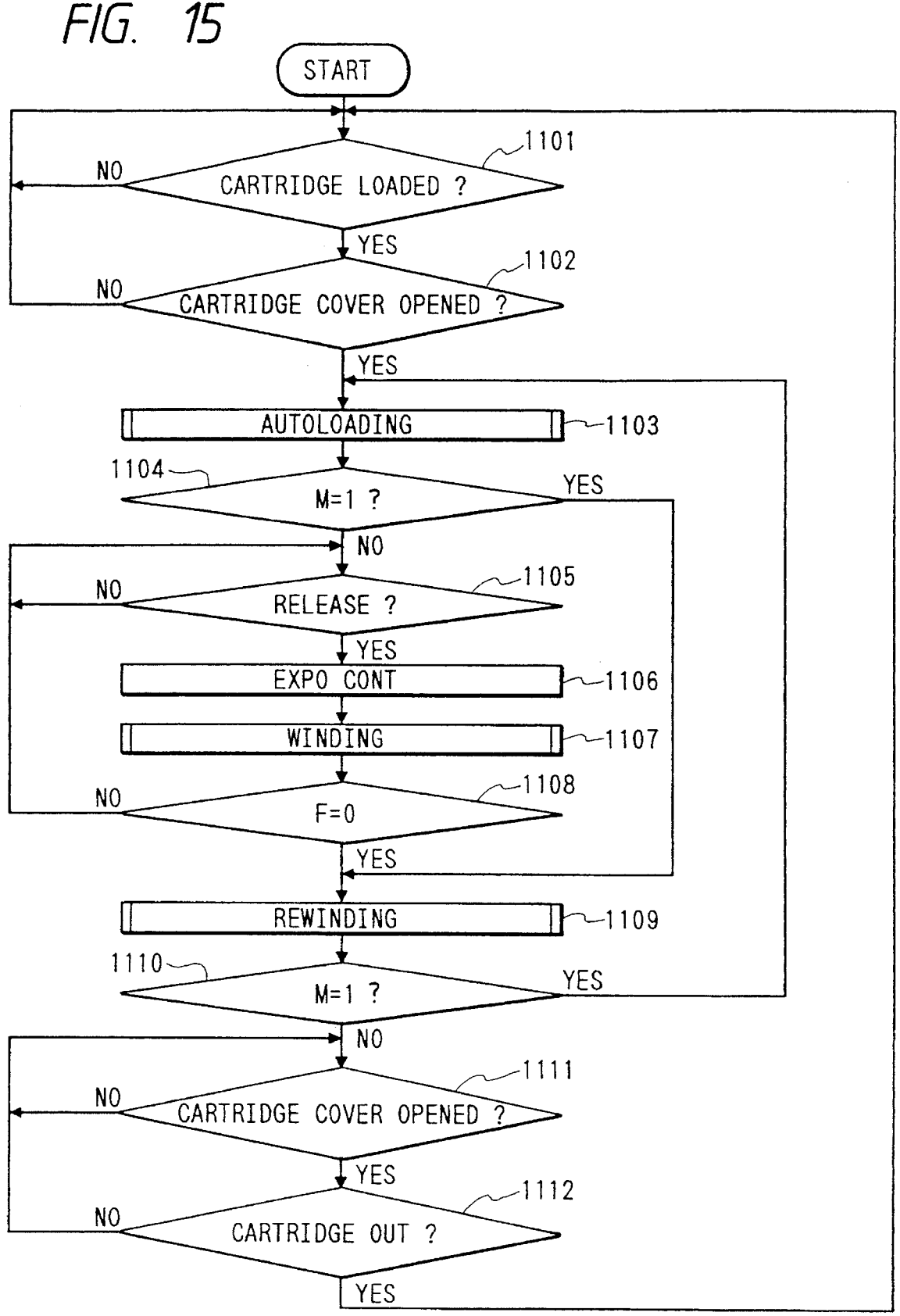
FIGS. 15 to 18 are flow charts for illustrating the operation of the apparatus.

In such a circuit construction, when the battery 551 is loaded into a camera, the program starts and as is apparent from FIG. 15, the loading of the cartridge 502 into the camera is confirmed by the closing and opening of the cartridge detecting switch 561 (step 1101). Simultaneously with the confirmation of the loading of the cartridge 502 into the camera, at a step 1102, the closed state of the cover is confirmed by the cartridge cover detecting switch 563, whereby at a step 1103, the automatic loading operation, i.e., so-called auto-loading, by the feeding-out of the film 501 from the cartridge 502 by the film feeding driving system and the taking-up of the film by the take-up spool 503 is effected.

Figure 16:
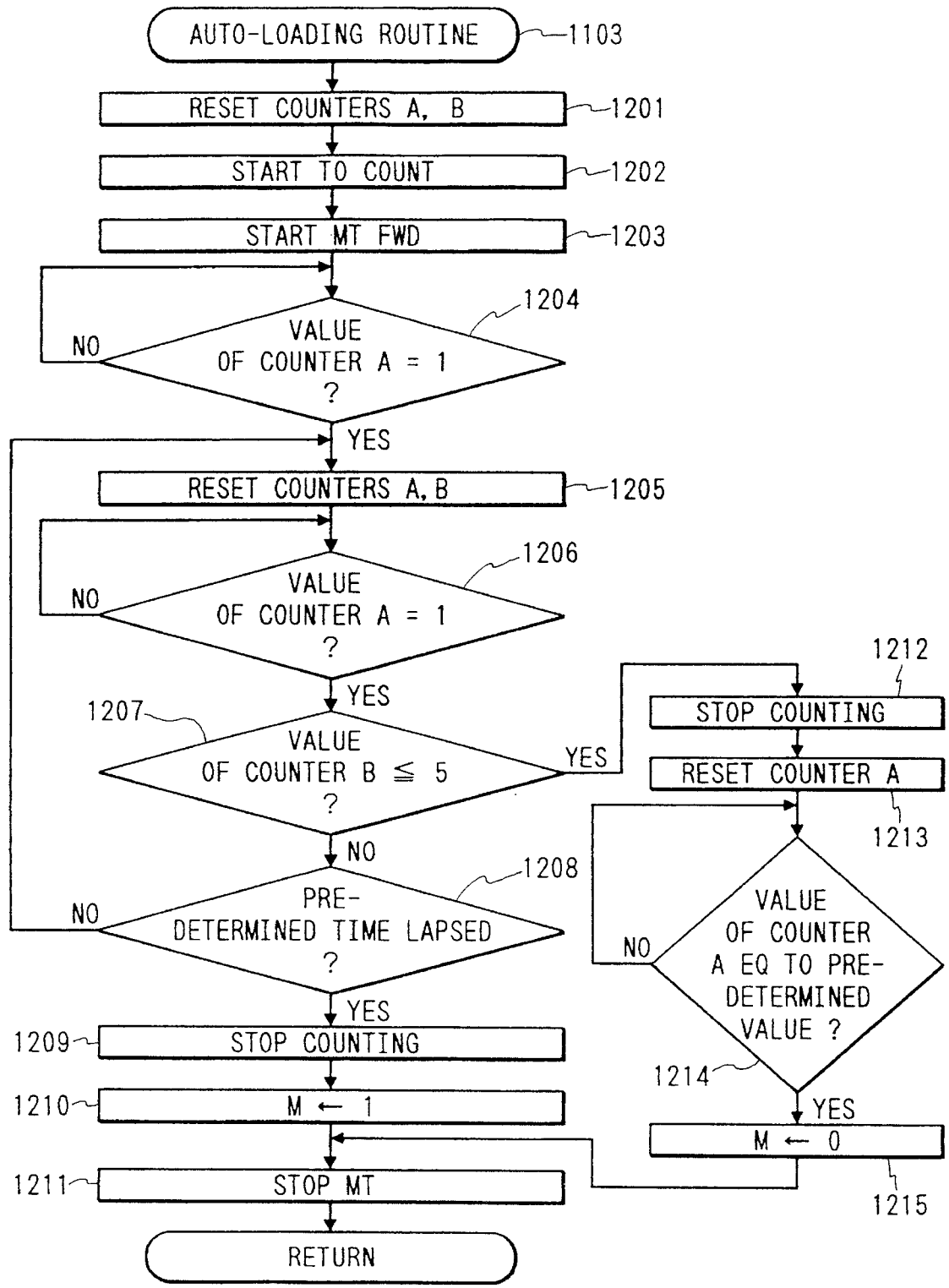

The details of this auto-loading routine 1103 are shown in FIG. 16. At a step 1201, the count values of the counters A and B shown in FIG. 14 are reset to 0 by a command from the CPU 560, and then at a step 1202, time counting is started. This time counting is used to judge whether the film 501 could be wound on the spool 503 within a predetermined time.

Subsequently, at a step 1203, the output port $O_1$ is set to a high level and the motor 511 is rotated in the forward direction by the motor control circuit 560, thereby effecting the feeding-out of the film 501 from the cartridge 502 and the rotative driving of the take-up spool 503.

At a step 1204, whether the count value of the counter A has become "1" is judged, and at a point of time whereat the count value has become "1", advance is made to a step 1205, where the count values of the counters A and B are reset to 0.

These steps 1204 and 1205 are provided so as to eliminate the initial irregularity after the start of the rotation of the motor 511 because immediately after the start of the forward rotation of the motor 511, the accurate rotation of the sprocket 530 cannot be detected by the film movement detecting switch 553 due to the irregularity of the initial position.

Subsequently, at a step 1206, whether the count value of the counter A has become "1" is judged, and at a point of time whereat the count value has become "1", advance is made to a step 1207, where whether the film 501 has twined around the spool 503 is judged by judging whether the count value of the counter B is "5" or less. That is, as is apparent from what has been described previously, the reduction gear ratio of the transmission gear system in the feeding apparatus 510 is determined so that the movement speed of the film 501 may become high when the film 501 has twined around the spool 503 and therefore, if a number of periods of the output pulse signal of the motor detecting switch 556 corresponding to one period of the output pulse signal of the film movement detecting switch 553, is detected by detecting the state shown in FIG. 13A or 13B, the twining of the film 501 around the spool 503 can be discriminated. Here, when as shown in FIG. 13B, five periods which is four periods plus a surplus of one period has been reached, that is, the count value of the counter A has become "1", the count value of the counter B is "5" or less, whereby the twining of the film 501 around the spool 503 is judged.

If at a step 1207, it is judged that the count value of the counter B is not "5" or less, it is judged that the film 501 does not twine around the spool 503, and at a step 1208, whether a predetermined time has not elapsed as counted time is judged, and if it is judged that auto-loading is going on, return is made to the step 1205, and if the lapse of the predetermined time is judged, it is judged that auto-loading has failed and the film 501 has been excessively fed out of the cartridge 502, and at a step 1209, the time counting is stopped, and at a step 1210, an auto-loading error flag M is set to "1", and then advance is made to a step 1211, where the forward rotation of the motor 511 is stopped and return is made to the main program.

On the other hand, if at the step 1207, it is judged that the count value of the counter B is "5" or less, it is judged that the film 501 has twined around the spool 503, and at a step 1212, the time counting is stopped and at a step 1213, the count value of the counter A is reset to 0. Then, at a step 1214, whether the count value of the counter A has become a predetermined value and the first frame of the film 501 has assumed a position corresponding to the aperture 507 is judged. It at this step 1214, it is judged that the count value of the counter A is not the predetermined value, it is judged that the first frame of the film 501 has not yet arrived at the aperture 507, and the program stays at the step 1214, and if it is judged that the count value of the counter A is the predetermined value, it is judged that the first frame of the film 501 has arrived at the position of the aperture 507, and advance is made to a step 1215, where the auto-loading error flag M is reset to 0, and at the aforementioned step 1211, the motor 511 is stopped and return is made to the main program. The auto-loading error flag M assumes "1" when it is judged that auto-loading has failed, and assumes "0" when auto-loading has succeeded.

At the step 1104 of the main program shown in FIG. 15, whether the value of the auto-loading error flag M is "0" or "1" is judged, and if said value is "0", advance is made to a step 1105, and if said value is "1", advance is made to a step 1109 which will be described later.

At the step 1105, whether release, i.e., the start of photographing, has been done is judged by the closing or opening of the release switch 565, and at a point of time whereat this switch 565 has been closed, advance is made to a step 1106.

At this step 1106, film sensitivity is read from a film sensitivity setting device, not shown, and the object luminance is read from an object luminance detecting device, not shown, whereby well-known exposure calculation is effected to calculate the shutter speed and the aperture value, and an exposure control device 567 is controlled so as to provide the calculated values, whereupon photographing is effected, and advance is made to a step 107.

Figure 17:
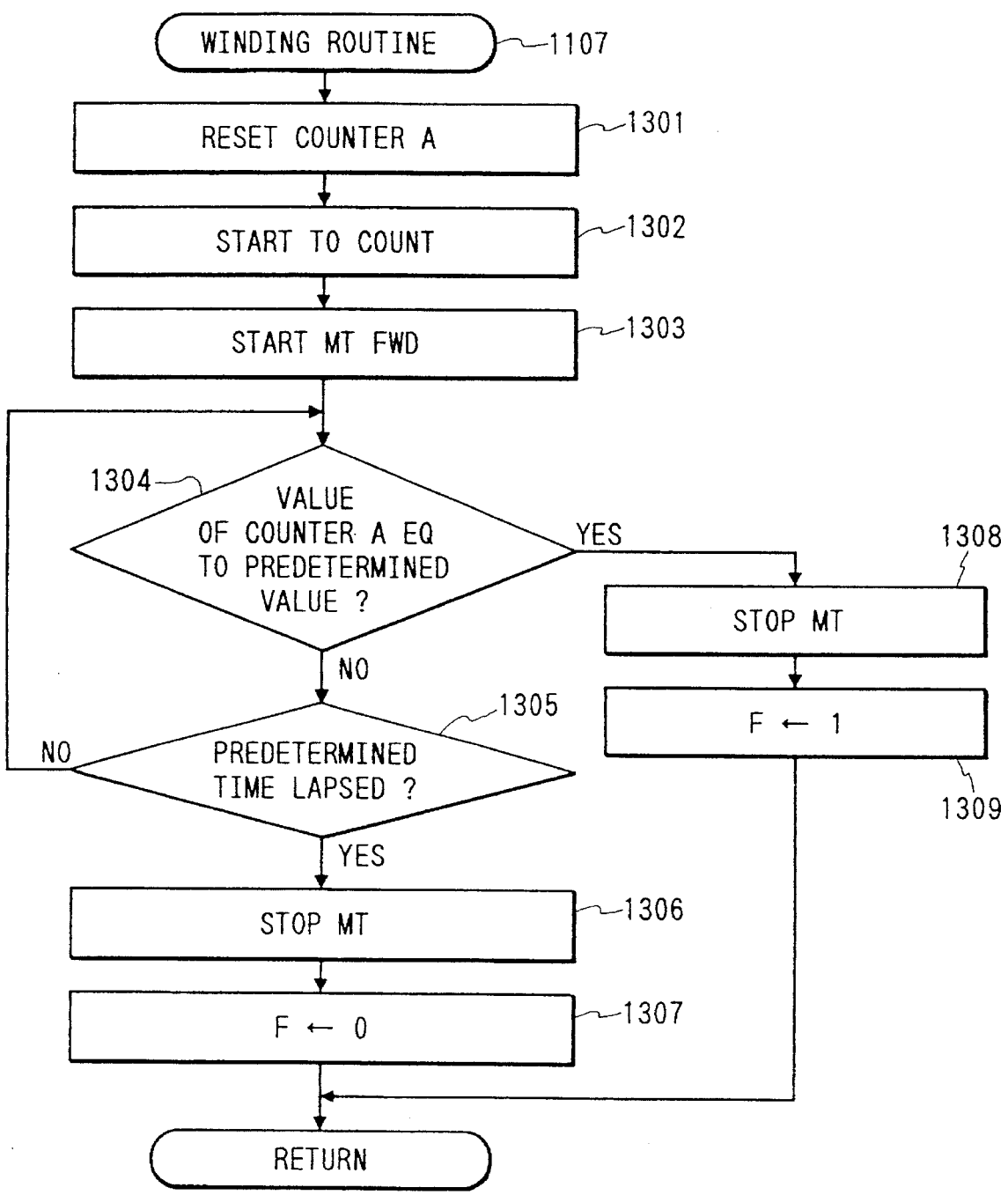

This step 1107 is a winding routine for winding up the film 501 by one frame, and the details thereof are shown in FIG. 17.

Briefly describing this, at a step 1301, the count value of the counter A is reset to 0, and at a step 1302, the time counting is started. This time counting is used to judge whether the film 501 has been fed by one frame within a predetermined time.

Subsequently, at a step 1303, the motor 511 is rotated in the forward direction by the control circuit 560, and at a step 1304, whether the count value of the counter A is a predetermined value corresponding to the feeding of one frame of the film 501 is judged. If at the step 1304, it is judged that the count value of the counter A is not the predetermined value and it is judged that the amount of feeding of the film 501 is not one frame, advance is made to a step 1305, where whether the time counted by the time counting started at the step 1302 has reached a predetermined time is judged, and if said time is not the predetermined time, it is judged that film feeding is going on, and return is made to the step 1304, and if it is judged that said time has reached the predetermined time, it is judged that the trailing end of the film 501 has come, because the film 501 cannot be fed by one frame within a predetermined time, and advance is made to a step 1307, where the forward rotation of the motor 511 is stopped, and at a step 1307, a winding-up completion flag F is reset to 0 and return is made to the main program.

On the other hand, if at the step 1304, it is judged that the count value of the counter A is a predetermined, it is judged that the film 501 has been fed by one frame, and advance is made to a step 1308, where the forward rotation of the motor 511 is stopped, and at a step 1309, the winding-up completion flag F is set to "1", and return is made to the main program. The winding-up completion flag F assumes "1" when one-frame feeding of the film could be done, and assumes "0" when one-frame feeding of the film could not be done and it has been judged that the trailing end of the film has come.

In the main program of FIG. 15, in subsequence to the winding step 1107, whether one-frame feeding of the film could be done or one-frame feeding of the film could not be done and the trailing end of the film has come is judged by whether at a step 1108, the winding-up completion flag F is "0". If at the step 1108, it is judged that the winding-up completion flag F is "1", it is judged that one-frame feeding of the film could be done, and return is made to the step 1105, and at a point of time whereat it has been judged that the winding-up completion flag F is "0", it is judged that one-frame feeding of the film cannot be done and the trailing end of the film has come, and a advance is made to a step 1109.

Figure 18:
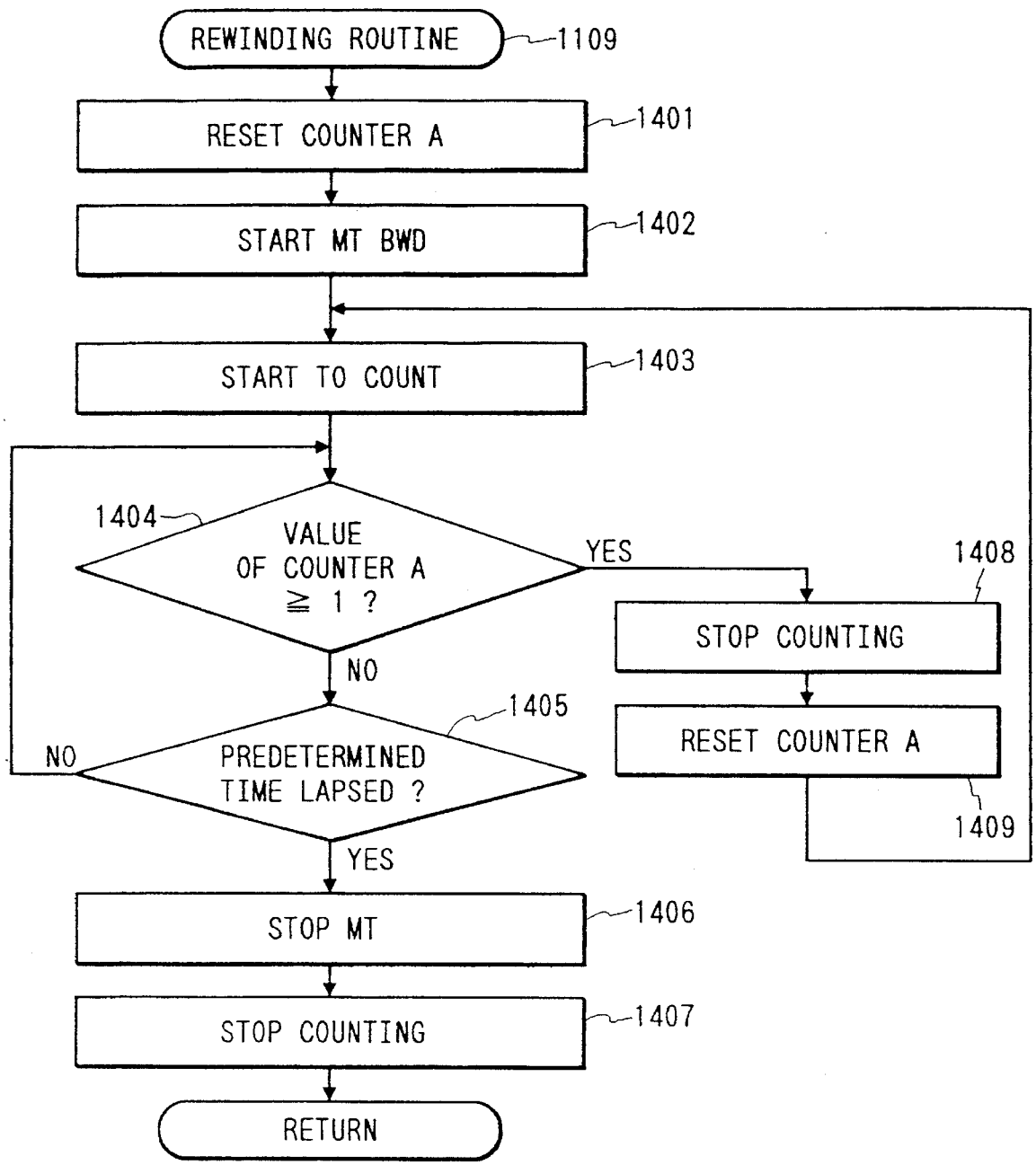

This step 1109 is a rewinding routine for rewinding the film 501 into the cartridge 502, and the details thereof are shown in FIG. 18. Briefly describing this, at a step 1401, the count value of the counter A is reset to 0, and at a step 1402, the motor 511 is driven in the backward direction by the control circuit 560 to thereby effect the rewinding of the film into the cartridge 502. At a step 1403, time counting is started. This time counting is used to count a predetermined time for which the film is reliably rewound into the cartridge 502 after the count value of the counter A has stopped varying, that is, after the leading end of the film 501 has passed the position of the sprocket 530.

Then, at a step 1404, whether the count value of the counter A is "1" or greater is judged, and if it is judged that said count value is "1" or greater, it is judged that the film 501 is being rewound while passing the sprocket 530, and advance is made to a step 1408, where the time counting started at the step 1403 is stopped, and at a step 1409, the count value of the counter A is reset to 0 and return is made to the step 1403.

On the other hand, if at the step 1404, it is judged that the count value of the counter A is "0", advance is made to a step 1405, where whether the time counted by the time counting started at the step 1403 has elapsed by a predetermined time is judged, and whether the film 501 has been reliably rewound into the cartridge 502 is judged. At a point of time whereat it has been judged at the step 1405 that the counted time has elapsed by the predetermined time, it is judged that the film has been reliably rewound into the cartridge 502, and advance is made to a step 1406, where the backward rotation of the motor 511 is stopped by the control circuit 560, and at a step 1407, the time counting is stopped and return is made to the main program.

Thereafter, at a step 1110 in the main program of FIG. 15, whether the rewinding is impossible due to the failure in auto-loading is judged by judging whether the auto-loading error flag M is "1". If at this step 1110, it is judged that auto-loading has failed due to M=1, return is made to the step 1103 to effect auto-loading again, and if M is "0", it is judged the rewinding now going on is the ordinary rewinding due to the trailing end of the film having come, and advance is made to a step 1111.

At the step 1111, whether the cartridge cover is opened is judged by detecting whether the cartridge cover detecting switch 563 is closed or opened, and upon closing of the switch 563, it is judged that the cover is not yet opened, and at a point of time whereat the switch 563 has been opened, it is judged that the cover is opened, and advance is made to a step 1112.

At this step 1112, whether the cartridge 502 has been removed from the camera is judged by the cartridge detecting switch 561, and at a point of time whereat this switch has been opened, the removal of the cartridge 502 is judged, and return is made to the step 1101, where the camera waits for the next photographing.

The present invention is not restricted to the structure of the above-described embodiment, but it is free to suitably modify or change the shapes, constructions, etc. of various portions including the construction of the film feeding apparatus 510, and various modifications would occur to mind. For example, in the above-described embodiment, the present invention has been illustratively shown with respect to film continuously formed with perforations 501a, but the present invention is also applicable to film intermittently formed with one or more perforations correspondingly to frames. Accordingly, means capable of detecting the moved state of the film is neither restricted to the combination of the perforations 501a and the sprocket 530, but suitable modifications will be conceivable. For example, the moved state of the film may be detected by monitoring the rotation of a roller which is urged against the film resulting from the movement of the film.

Further, in the aforedescribed embodiment, the present invention has been described with respect to a construction in which a single motor 511 is used as the drive source and the one-way clutch 520 is interposed in the rotation transmitting system of the motor, whereas the present invention is not restricted thereto, but various modifications in which a plurality of motors are used and the transmission of rotation between the motor and the driven side is cut off by a conventional clutch would occur to mind.

As described above, in the film feeding apparatus according to the present invention, provision is made of an electric motor for driving film take-up means for rotatively driving a take-up spool at a speed higher than the feeding speed of film fed out of a cartridge to thereby wind the leading end of the film along and around the outer peripheral portion of said take-up spool, reference signal detecting means for outputting a pulse signal each time said motor is rotated by a predetermined amount, film movement amount detecting means for outputting a pulse signal each time the film is moved by a predetermined amount, and judgment means for judging with the generation period of the pulse signal from said reference signal detecting means as the reference whether the generation period of the pulse signal from said film movement amount detecting means has varied and judging that the generation period of said pulse signal has varied, thereby judging the film has twined around said take-up spool, and this leads to the various excellent effects that with the rotational speed of the motor as the reference, the twining of the film around the spool can be judged from the comparison with the movement speed of the film and particularly, the judgment of the automatic loading operation can be done appropriately and reliably, independently of the fluctuation of the rotational speed of the motor caused by the fluctuation of the load of the motor and that there is no possibility of causing the problem that the film is erroneously forced out.

Also, according to the present invention, as a film cartridge, use is made of a film cartridge designed such that the spool shaft thereof is rotated in the feeding-out direction to thereby feed the film out of a feeding-out port, and a rotation transmitting system for effecting the transmission of rotation from the electric motor for rotatively driving the take-up spool is connected to the spool shaft of the cartridge and also, this rotation transmitting system is provided with a clutch for cutting off the transmission of rotation when the judgment means discriminates a variation in the signal generation period, and this also leads to the advantage that it is possible to construct a wasteless film feeding and driving system which cuts off the film feeding-out force of the cartridge side at a point of time whereat automatic film loading is effected.

What is claimed is:

1. A film feeding apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising:

a winding spool capable of winding the film;

a film feeding mechanism for rotating the cartridge spool shaft to feed the entirely enclosed film from the inside of the film cartridge to the outside thereof until the film reaches the winding spool;

a detector for detecting that the film is not wound on the winding spool and outputting a detection signal;

a rewinding mechanism electrically connected to said detector, and responsive to said detection signal to rewind the film entirely to the inside of the film cartridge; and a redriving mechanism electrically connected to said rewinding mechanism and said film feeding mechanism, for driving said film feeding mechanism after completion of the rewinding of the film by said rewinding mechanism, thereby to feed the film again from the cartridge to the winding spool.

2. A film feeding apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising:

a winding spool capable of winding the film;

a film feeding mechanism for rotating the cartridge spool shaft to feed the entirely enclosed film from the inside of the film cartridge to the outside thereof until the film reaches the winding spool;

a detector for detecting a film moving state and outputting a detection output;

a judging unit for judging a variation state of the detection output from said detector, and outputting a detection signal;

a rewinding mechanism electrically connected to said judging unit, and responsive to said detection signal to rewind the film entirely to the inside of the film cartridge; and a redriving mechanism electrically connected to said rewinding mechanism and said film feeding mechanism, for driving said film feeding mechanism after completion of the rewinding of the film by said rewinding mechanism, thereby to feed the film again from the cartridge to the winding spool.

3. A film feeding apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising:

a winding spool capable of winding the film;

a film feeding mechanism for rotating the cartridge spool shaft to feed the entirely enclosed film from the inside of the film cartridge to the outside thereof until the film reaches the winding spool;

a first detector for detecting whether or not an end of the film fed out to the outside of the film cartridge by said film feeding mechanism has become wound on the winding spool, and outputting a first detection signal when the end of the film has not been wound thereon;

a second detector for detecting whether or not a final frame of the film has been exposed, and outputting a second detection signal when the final frame has been exposed;

a rewinding mechanism for rewinding the film entirely to the inside of the film cartridge; and a controller electrically connected to said first and said second detectors, said rewinding mechanism and said film feeding mechanism for controlling so that said rewinding mechanism rewinds the film entirely to the inside of the film cartridge when either of the first and the second detection signals is outputted, and thereafter said film feeding mechanism feeds the film again when the first detection signal has been outputted but does not feed the film again when the second detection signal has been outputted.

4. A film feeding apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising:

a winding spool capable of winding the film;

a film feeding mechanism for rotating the cartridge spool shaft to feed the entirely enclosed film from the inside of the film cartridge to the outside thereof until the film reaches the winding spool;

a detector for detecting a film moving state and outputting a detection output;

a judging unit electrically connected to said detector, for judging a change of the film moving state in accordance with the detection output, and outputting a detection signal when the film moving state is not changed during a predetermined period;

a rewinding mechanism electrically connected to said judging unit, and responsive to said detection signal to rewind the film entirely to the inside of the film cartridge; and a redriving mechanism electrically connected to said rewinding mechanism, and said film feeding mechanism, for driving said film feeding mechanism after completion of the rewinding of the film by said rewinding mechanism, thereby to feed the film again from the cartridge to the winding spool.

5. A film feeding aparatus in a camera according to claim 4, wherein said judging unit outputs the detection signal when a film moving speed does not become faster than before.

6. A film feeding apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising:

a motor;

a winding spool capable of winding the film;

a film feeding mechanism for rotating the cartridge spool shaft to feed the entirely enclosed film from the inside of the film cartridge to the outside thereof until the film reaches the winding spool;

a winding spool driving mechanism driven by said motor to rotatively drive said winding spool at a speed higher than the speed at which the film is fed out from said film cartridge, thereby winding the film on said winding spool when a leading end of the film is brought into contact with an outer peripheral portion of said winding spool;

a first detector for outputting a pulse signal corresponding to the rotational speed of said motor;

a second detector for outputting a pulse signal corresponding to the movement speed of the film; and a judging unit electrically connected to said first and said second detectors, for judging, with a generation period of the pulse signal from said first detector as a reference, whether a generation period of the pulse signal from said second detector has not varied during a predetermined time, thereby discriminating that the film has not been wound on said winding spool;

a rewinding mechanism electrically connected to said judging unit, and responsive to said judging unit to rewind the film entirely into said film cartridge when said judging unit judges that the generation period of said pulse signal from said second detector has not varied; and a redriving mechanism electrically connected to said rewinding mechanism and said film feeding mechanism, for driving said film feeding mechanism after completion of the rewinding of the film by said rewinding mechanism, thereby to feed the film again from the cartridge to the winding spool.

7. A film feeding method for an apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising the steps of:

driving the cartridge spool shaft to feed the entirely enclosed film from the inside of the film cartridge to the outside thereof until the film reaches a winding spool;

outputting a detection signal when it is detected that the film is not wound on the winding spool;

rewinding the film entirely to the inside of the film cartridge in response to the detection signal; and driving the cartridge spool shaft to feed the film again from the inside of the film cartridge to the outside thereof after completion of the rewinding of the film.

8. A film feeding method for an apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising the steps of:

driving the cartridge spool shaft to feed the entirely enclosed film from the inside of the film cartridge to the outside thereof until the film reaches a winding spool;

detecting a film moving state and outputting a detection output;

judging a variation state of the detection output and outputting a detection signal;

rewinding the film entirely to the inside of the film cartridge in response to the detection signal; and driving said cartridge spool shaft to feed the film again from the inside of the film cartridge to the outside thereof after completion of the rewinding of the film.

9. A film feeding method for an apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising the steps of:

driving the cartridge spool shaft to feed the entirely enclosed film from the inside of the film cartridge to the outside thereof until the film reaches a winding spool;

detecting whether an end of the film fed to the outside of the film cartridge has become wound on the winding spool, and outputting a first detection signal when the film has not become wound on the winding spool;

detecting whether a final frame of the film has been exposed, and outputting a second detection signal when the final frame has been exposed; and rewinding the film entirely into the film cartridge when either of the first and the second detection signals is outputted, and thereafter driving said cartridge spool shaft again to feed the film from the inside of the film cartridge to the outside thereof when the first detection signal has been outputted, but inhibiting said driving of said cartridge spool shaft again when the second detection signal has been outputted.

10. A film feeding method for an apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising the steps of:

driving the cartridge spool shaft to feed the entirely enclosed film from the inside of the film cartridge to the outside thereof until the film reaches a winding spool;

detecting a film moving state and outputting a detection output;

judging a change of the film moving state in accordance with said detection output and outputting a detection signal when the film moving state is not changed during a predetermined period;

rewinding the film entirely to the inside of the film cartridge in response to the detection signal; and driving said cartridge spool shaft to feed the film again from the inside of the film cartridge to the outside thereof after completion of the rewinding of the film.

11. A film feeding method for an apparatus capable of loading a film cartridge having a film entirely enclosed therein and a cartridge spool shaft, the film being able to be fed out from the inside of the film cartridge to the outside thereof or entirely rewound from the outside of the film cartridge to the inside thereof by rotating the cartridge spool shaft, comprising the steps of:

driving the cartridge spool shaft to feed the entirely enclosed film from the inside of the film cartridge to the outside thereof until the film reaches a winding spool;

rotatively driving the winding spool at a speed higher than the speed at which the film is fed out from the film cartridge by the cartridge spool shaft, and winding the film on the winding spool when a leading end of the film is brought into contact with an outer peripheral portion of the winding spool;

outputting a rotation pulse signal corresponding to the rotational speed of the winding spool;

outputting a movement pulse signal corresponding to the movement speed of the film; and judging, with a generation period of the rotation pulse signal as a reference, whether a generation period of the movement pulse signal has not varied during a predetermined time, thereby discriminating that the film has not been wound on said winding spool;

rewinding the film entirely to the inside of the film cartridge when no variation of the generation period of the movement pulse signal during said predetermined period is judged; and driving the cartridge spool shaft after completion of rewinding of the film to feed the film again from the inside of the cartridge to the outside thereof.

* * * * *